United States Patent Office 3,634,430
Patented Jan. 11, 1972

3,634,430
SUBSTITUTED 7-HETEROCYCLIC - 7,8-DIHYDRO-6-
(HYDROXY OR METHOXY)-6,14-ENDO(ETHENO
OR ETHANO)CODIDES AND MORPHIDES
John Johnston Brown, Pearl River, N.Y., and Robert
Allis Hardy, Jr., Ridgewood, N.J., assignors to American Cyanamid Company, Stamford, Conn.
No Drawing. Continuation-in-part of application Ser. No.
772,869, Nov. 1, 1968, which is a continuation-in-part
of application Ser. No. 697,315, Jan. 12, 1968. This
application June 13, 1969, Ser. No. 833,164
Int. Cl. C07d 43/28
U.S. Cl. 260—285
9 Claims

ABSTRACT OF THE DISCLOSURE

This disclosure describes compounds of the class of substituted 7-heterocyclic-7,8-dihydro-6-methoxy-6,14-endo-(etheno or ethano)codides and morphides which possess analgesic activity.

CROSS REFERENCE TO RELATED APPLICATIONS

This application is a continuation-in-part of our copending application Serial No. 772,869, filed Nov. 1, 1968, now abandoned, which is a continuation-in-part of our application Serial No. 697,315, filed Jan. 12, 1968, now abandoned.

BRIEF SUMMARY OF THE INVENTION

This invention relates to novel substituted 7-heterocyclic 7,8-dihydro-6-methoxy - 6,14 - endo(etheno or ethano) codides and morphides and to methods of preparing these compounds. The novel compounds of the present invention may be represented by the following general formula:

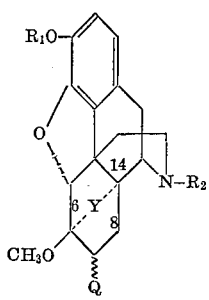

(I)

wherein $R_1$ is hydrogen, lower alkyl or lower alkanoyl; $R_2$ is hydrogen, cyano, propargyl, lower alkyl, phenyl lower alkyl, lower alkenyl or lower cycloalkylmethyl; Y is etheno or ethano; and Q is

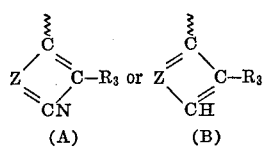

wherein $R_3$ is hydrogen or alkyl of from 1 to 7 carbon atoms; and Z is

—N($R_4$)—N=, —O—N= or —N=C($NH_2$)—N= wherein $R_4$ is hydrogen, lower alkyl, phenyl, halophenyl, lower alkylphenyl, lower alkoxyphenyl, trifluoromethylphenyl, nitrophenyl, pyridyl, quinolyl, benzothiazolyl, dimethylpyrimidyl or dimethyl-s-triazinyl. Suitable lower alkyl, lower alkoxy and lower alkanoyl groups contemplated by the present invention are those having from 1 to 4 carbon atoms such as methyl, ethyl, isopropyl, n-butyl, methoxy, ethoxy, n-propoxy, n-butoxy, formyl, acetyl, propionyl, isobutyryl, etc. Typical alkyl groups of from 1 to 7 carbon atoms are, for example, methyl, ethyl, n-propyl, n-butyl, isoamyl, sec.-hexyl, n-heptyl, etc. Suitable lower alkenyl groups are those having up to about 6 carbon atoms such as, for example, allyl, methallyl, dimethallyl, and the like. Suitable lower cycloalkylmethyl groups are those having from 4 to 7 carbon atoms such as cyclopropylmethyl, cyclobutylmethyl, cyclopentylmethyl, etc. Phenyl lower alkyl is exemplified by benzyl, α-phenylethyl, β-phenylethyl, and the like. Suitable halophenyl groups are, for example, p-fluorophenyl, p-chlorophenyl, m-chlorophenyl, m-bromophenyl, o-fluorophenyl, 2,5-dichlorophenyl, 2,4,6-trichlorophenyl, 3,5-dichlorophenyl, 2,6-dibromophenyl, pentafluorophenyl, etc. Suitable lower alkylphenyl groups are, for example, p-tolyl, m-tolyl, o-tolyl, p-ethylphenyl, p-isopropylphenyl, m-isobutylphenyl, etc. Suitable lower alkoxyphenyl groups are, for example, m-methoxyphenyl, o-methoxyphenyl, m-ethoxyphenyl, p-isopropoxyphenyl, etc. Nitrophenyl is exemplified by o-nitrophenyl, m-nitrophenyl and p-nitrophenyl. Pyridyl, quinolyl and dimethylpyrimidyl are exemplified by 2-pyridyl, 3-pyridyl, 4-pyridyl, 2-quinolyl, 3-quinolyl, 4-quinolyl, 4,6-dimethyl-2-pyrimidyl and 5,6-dimethyl-2-pyrimidyl. It should be noted that when Z is —N=C($NH_2$)—N= then structures (A) and (B) represent two resonance forms of the pyrimidine ring; and when Z is —NH—N= then structures (A) and (B) represent tautomers of the pyrazone ring.

DETAILED DESCRIPTION OF THE INVENTION

The novel compounds of the present invention are generally obtainable as crystalline materials having characteristic melting points and absorption spectra. They are appreciably soluble in many organic solvents such as ethanol, chloroform, benzene, ethyl acetate, and the like. They are, however, generally insoluble in water.

The organic bases of this invention form acid-addition salts with a variety of organic and inorganic salt-forming agents. Thus acid-addition salts, formed by admixture of the organic free base with an equivalent amount of an acid, suitably in a neutral solvent, are formed with such acids as sulfuric, phosphoric, hydrochloric, hydrobromic, citric, lactic, tartaric, acetic, gluconic, ascorbic, and the like. Also included within the purview of the present invention are the alkali metal salts (e.g., sodium and potassium) of the organic free bases when $R_1$ in the above general formula is hydrogen. For purposes of this invention, the organic free bases are equivalent to their acid-addition salts and their alkali metal salts.

The novel substituted 7 - heterocyclic - 7,8 - dihydro-6-methoxy-6,14-endo(etheno or ethano)codides and morphides (IA) and IB) of the present invention may be readily prepared by treating an appropriately substituted 7-(2-formyl-1-alkoxyvinyl) derivative (II) with a heterocycle-forming reagent in accordance with the following reaction scheme:

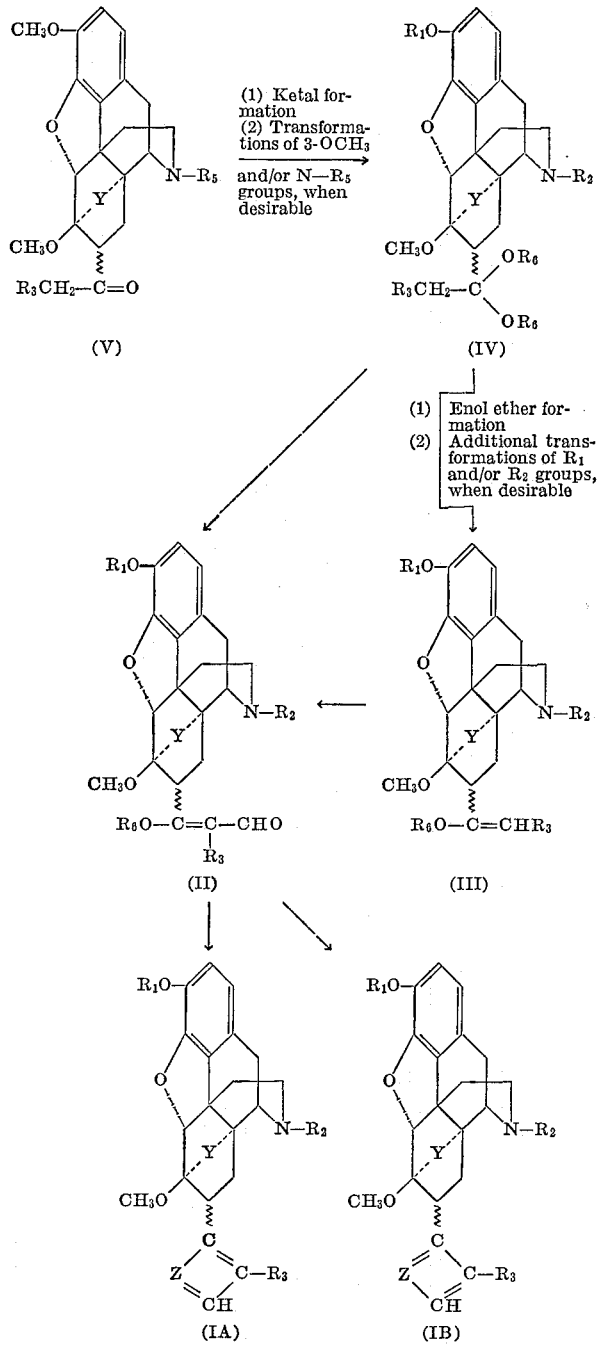

wherein $R_1$, $R_2$, $R_3$, Z and Y are as previously defined; $R_5$ is hydrogen, cyano, propargyl, lower alkyl, lower alkenyl, phenyl lower alkyl or lower cycloalkylcarbonyl; and $R_6$ is lower alkyl. In accordance with the above reaction scheme, the intermediate 7 - [di(lower alkoxy)methyl] - 7,8 - dihydro - 6 - methoxy - 6,14 - endo(etheno or ethano)codides and morphides (IV) may be readily prepared from an appropriately substituted 7 - alkanoyl-7,8-dihydro - 6 - methoxy - 6,14 - endo(etheno or ethano) codide (V) by treatment with a suitable acid and a lower alkanol ($R_6OH$), generally in the presence of its corresponding tri(lower alkyl)orthoformate ester $$[HC(OR_6)_3]$$

(e.g., methanol and trimethyl orthoformate, ethanol and triethyl orthoformate, etc.). This reaction is conveniently carried out in an excess of the lower alkanol as the solvent, although in other cases an inert solvent such as benzene may be used. The preferred temperature range is from about 15° C. to about 100° C., over a period of time of from about several minutes to 24 hours or more. Suitable acids, include, for example, perchloric acid, p-toluenesulfonic acid, sulfuric acid, hydrochloric acid, and the like. A preferred procedure is the reaction of the 7-alkanoyl derivative (V) with perchloric acid and the lower alkanol-tri(lower alkyl)orthoformate mixture (especially methanol-trimethyl orthoformate) at room temperature for about 5–10 minutes, at which time the transformation is substantially complete. The 7 - alkanoyl-6-methoxy codides (V) required as starting materials are readily obtained as described by K. W. Bentley et al., J. Org. Chem. 23, 1925 (1958), and J. Am. Chem. Soc. 89, 3267, 3273 (1967).

The 7 - (1 - alkoxy - 1 - alken - 1 - yl) - 7,8 - dihydro-6 - methoxy - 6,14 - endo(etheno or ethano)codides and morphides (III) may be prepared from an appropriately substituted 7 - [di(lower alkoxy) - methyl] - 7,8 - dihydro-6 - methoxy - 6,14 - endo(etheno or ethano)codide or morphide (IV) in accordance with the above reaction scheme. These C–19 ketal derivatives (IV; the C–19 carbon being bonded to the C–7 carbon) are readily converted to the C–19 enol ethers (III) by heating the C–19 ketals above their melting points. This reaction is carried out at from about 150° C. to about 250° C. A preferred temperature is about 200° C. This conversion is generally carried out in the absence of any solvent, and requires from a few minutes to an hour or more for substantial completion.

A suitably substituted 7 - [di(lower alkoxy)methyl] derivative (IV) is treated with a formylating agent followed by hydrolysis and the intermediates (II) are isolated directly. Alternatively, a suitably substituted 7-(1-alkoxy - 1 - alken - 1 - yl) derivative (III), may be converted to the intermediates (II) by formylation and hydrolysis. By this route, the 7 - (1 - alkoxy - 1 - alken-1-yl) derivatives (III) may be isolated and purified or may be prepared "in situ" and formulated without isolation or purification depending upon the circumstances.

The formylating reagent is prepared by treating a substituted formamide such as N,N-dimethylformamide, N,N - diethylformamide, N - formylpiperidine, N-formylmorpholine, N-methylformanilide, and the like, with phosgene, phosphoryl chloride or thionyl chloride in an inert solvent such as methylene chloride, ethylene chloride or chloroform. Alternatively, an excess of the substituted formamide may be used as the solvent. The formylation reaction (IV→II or III→II) is also most conveniently carried out in an inert solvent such as methylene chloride, ethylene chloride, chloroform, or an excess of the substituted formamide employed to prepare the formylating reagent. The temperature range for the formylation reaction is from about 0° C. to about 35° C. although room temperature is preferred. The hydrolysis step may be carried out with dilute acid or dilute alkali but preferably with aqueous sodium acetate. When the formylation reaction is substantially complete (usually from several minutes to several hours or more), the reaction mixture is stirred with aqueous sodium acetate or aqueous sodium hydroxide for from several minutes to several hours at room temperature and the product is isolated. The above described formylation reaction may be considered to be effected via a formylating reagent such as that shown by compound (VI), the formylating reagent formed from N,N-dimethylformamide and phosgene. This formylating reagent then reacts with the ketal (IV) or enol-ether (III) to form an iminium intermediate (VII) (partial

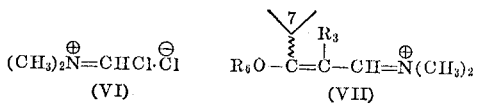

structure only shown) which is converted by hydrolysis to the intermediates (II).

The conversion of the 7-(2-formyl-1-alkoxyvinyl) derivatives (II) to the corresponding 7-heterocyclic-7,8-dihydro-6-methoxy-6,14-endo(etheno or ethano)codides and morphides (IA) and (IB) of the present invention may be readily accomplished by treating an appropriately substituted 7-(2-formyl-1-alkoxyvinyl) derivative (II) with a heterocycle-forming reagent such as hydrazine, a substituted hydrazine of the formula $R_4NHNH_2$, hydroxylamine or guanidine. By this scheme, selection of the heterocycle-forming reagent and the appropriate condensation conditions then determines the isomeric form of the product as (IA) or (IB). For example, when the heterocycle-forming reagent is hydrazine, the products (IA) and (IB), where Z is —NH—N=, represent tautomers of the pyrazole ring. As such, these tautomers are not ordinarily separable, and the tautomeric structure of an individual product in crystal form or in solution is determined by the individual properties of the specific compound. Physical methods such as infrared, nuclear magnetic resonance and ultraviolet spectra may be useful in determining tautomeric formulae as is X-ray crystallographic analysis.

When the heterocycle-forming reagent is a substituted hydrazine ($R_4NHNH_2$) or hydroxylamine, the products (IA) and (IB), where Z is —N($R_4$)—N= or —O—N=, represent pyrazole or oxazole ring isomers capable of individual existence and separation from each other with distinct and different properties. The isomer formed in a given condensation reaction is governed by the specific condensation conditions (solvent, temperature, etc.), and the individual condensing reagent (substituted hydrazine or hydroxylamine). The products of these condensation reactions may be one isomer or the other (IA or IB) in a substantially pure state or a mixture of the two isomers. Methods of separation and purification well known to those skilled in the art such as extraction, fractional crystallization, chromatographic separation and purification and the like may then be used to isolate the individual isomers (IA or IB). Physical methods, particularly including nuclear magnetic resonance and ultraviolet spectra, are useful in establishing the isomeric structure of individual condensation products (IA or IB).

When the heterocycle-forming reagent is guanidine then structures (IA) and (IB), where Z is

represent two resonance forms of the pyrimidine ring.

These condensation reactions are conveniently carried out in solvents such as acetic acid, dilute hydrochloric acid, ethanol, propanol, and the like. The temperature range employed is from about 50° C. to about 125° C. with the preferred range being from 80° C. to 125° C. The reaction is conveniently carried out by heating on the steam bath or at the refluxing temperature of the solvent, and is substantially complete within about one hour to several hours or more. The novel products of the present invention are isolated therefrom and purified by standard procedures.

Inherent in the above described general preparative scheme for the novel compounds of the present invention are transformations of the 3-substituent ($R_1$) and/or transformations of the N-substituent ($R_2$), if required. For example, the 3-methoxy derivatives (codide series; III and IV) may be transformed to 3-hydroxy derivatives (morphide series; III and IV) by heating with an alkali metal hydroxide in diethylene glycol. A particular advantage of this transformation is the fact that the C-19 ketal group and the C-19 enol ether moiety (in III and IV; the C-19 carbon being bonded to the C-7 carbon) are unaffected during this reaction with alkali at an elevated temperature. Similar treatment of C-7 ketones (such as V) with alkaline reagents has produced molecular rearrangments in which the 7-ketone group is altered. Thus, the alkaline transformation of a 3-alkoxy group to a 3-hydroxy group in the presence of a C-19 ketal or a C-19 enol ether represents a particularly desirable feature of the present invention. This reaction is generally carried out at a temperature range of from about 150° C. to about 240° C., the range of from about 200° C. to about 220° C. being preferred. Heating is continued until the reaction is substantially complete, generally from about several minutes to several hours or more. Suitable metal hydroxides include potassium hydroxide, sodium hydroxide, and the like. 3-alkanoyl morphides are obtained upon treatment of the above produced 3-hydroxy derivatives with alkanoic anhydrides such as acetic anhydride, propionic anhydride and the like, using procedures well known to those skilled in the art.

Transformations of the N-substituent ($R_2$ in III and IV) are also useful methods for the compounds of this invention; and for certain examples are the preferred method of synthesis. The N-methyl derivatives (codides and morphides; $R_2=CH_3$) may be treated with cyanogen halides using procedures well known to those skilled in the art. N-cyano derivatives ($R_2=CN$) within the scope of this invention are thereby obtained. Hydrolysis of the N-cyano derivatives by heating with a metal hydroxide in diethylene glycol may then be employed to produce norcodides and normorphides ($R_2=H$). This procedure is particularly advantageous in that the C-19 ketal group and the C-19 enol ether moiety (In III and IV) are unaffected by treatment with alkali at an elevated temperature. Similar treatment of C-7 ketones (such as V) with alkaline reagents has produced molecular rearrangements in which the C-7 ketone is a reactive moiety. Thus, the alkaline hydrolysis of an N-cyano group to an NH group in the presence of a C-19 ketal or a C-19 enol ether represents a particularly desirable feature of the present invention. This reaction is generally carried out at a temperature of from about 130° C. to about 240° C., and the range of from about 150° C. to about 180° C. is preferred. In the preferred temperature range, hydrolysis of the N-cyano group proceeds readily without extensive transformation of a 3-methoxy group (if present). At higher temperatures, that is in the range of from about 200° C. to about 220° C., concomitant hydrolysis of both N-cyano and 3-methoxy groups takes place. This procedure which simultaneously transforms an N-cyano group and a 3-methoxy group is, therefore, the preferred method of synthesis for certain examples of this invention. Heating is continued until the reaction is substantially complete, generally from about several minutes to several hours or more. Suitable metal hydroxides include potassium hydroxide, sodium hydroxide, and the like. These norcodides and normorphides containing the secondary amine moiety are then realkylated with a suitable alkyl, cycloalkylmethyl, phenyl lower alkyl or propargyl halide or equivaent using procedures well known to those skilled in the art. Suitable alkylating agents include ethyl iodide, propargyl tosylate, benzyl chloride, phenethyl bromide, allyl bromide, methallyl bromide, dimethallyl bromide and the like.

N-cycloalkylmethyl derivatives (III and IV, $R_2$=cycloalkylmethyl) are conveniently obtained from the nor-compounds by acylation with cycloalkylcarbonyl halides followed by reduction with lithium aluminum hydride. Suitable reactants are cyclopropanecarbonyl chloride, cyclobutanecarbonyl bromide, and the like. Another especially desirable feature of the present invention is the fact that lithium aluminum hydride reduction of the cycloalkylcarbonyl amides (III and IV, $R_2$=cycloalkylcarbonyl) proceeds readily, while the C-19 ketal group and the C-19 enol ether moiety are unaffected. Similar reduction of N-cycloalkylcarbonyl groups in compounds containing a C-7 ketone group (i.e., V; $R_5$=cyclopropylcarbonyl and $R_3$=methyl) is not possible without concomitant reduction of the ketone.

A preferred embodiment of the novel compounds (IA and IB) of the present invention may be illustrated by the following reaction scheme:

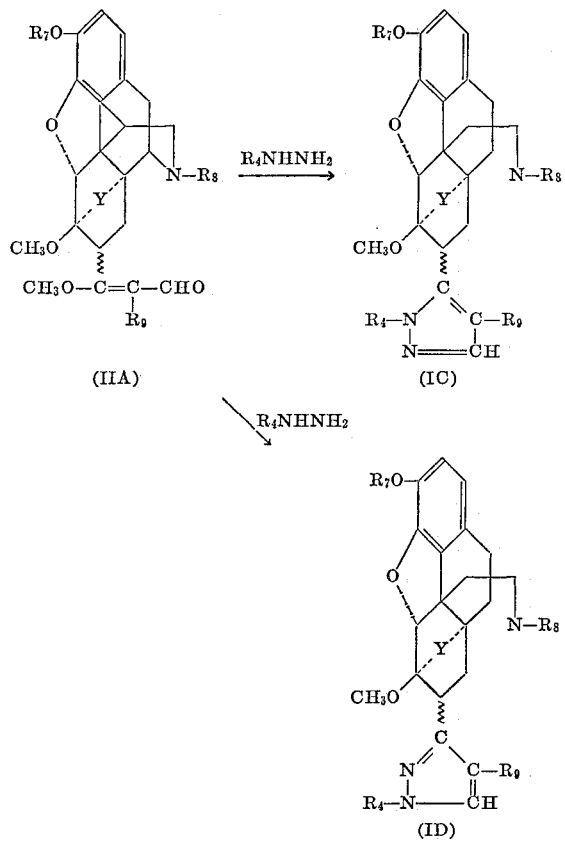

wherein $R_7$ is hydrogen or methyl; $R_3$ is hydrogen, cyano, methyl, lower alkenyl or lower cycloalkylmethyl; $R_9$ is hydrogen or alkyl of from 1 to 4 carbon atoms; and $R_4$ and Y are as hereinabove defined. By this procedure, an appropriately substituted 7-(2-formyl-1-methoxyvinyl) derivative (IIA) is condensed with a hydrazine derivative $R_4NHNH_2$. The condensation products are the isomers (IC) or (ID) which may be isolated in substantially pure form or obtained as mixtures and separated by well known methods. The nuclear magnetic resonance and ultraviolet spectra of these compounds provide definitive structural assignments for these pyrazole isomers. For example, a specific pair of isomers derived from condensation with phenylhydrazine is illustrated by (VIII) and (IX) (partial structures only shown) related to (IC) and (ID), respectively:

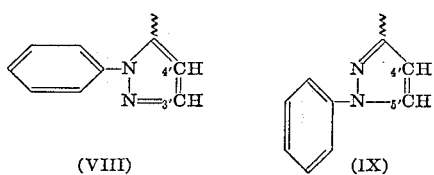

The nuclear magnetic resonance and ultraviolet spectra of (VIII) and (IX) ($R_1$=H, $R_2$=cyclopropylmethyl, Y=etheno) are characteristic for the pyrazole isomers. The pyrazole olefinic protons in the nuclear magnetic resonance spectrum of (VIII) ($C_{3'}$—H and $C_{4'}$—H, doublets at $\delta$ 7.50 and $\delta$ 6.13, respectively, in $d_6$–DMSO) have a coupling constant of 1.8 c.p.s., whereas the coupling constant of the analogous protons in isomer (IX) ($C_{5'}$—H and $C_{4'}$—H, doublets at $\delta$ 8.25 and $\delta$ 6.17, respectively, in $d_6$–DMSO) is numerically larger (i.e. 2.5 c.p.s.), as expected. In addition, the N-phenyl protons of the 1-penyl-5-pyrazolyl isomer (VIII) appear as a sharp singlet at $\delta$ 7.54, while those of the 1-phenyl-3-pyrazolyl compound (IX) appear as a broad multiplet at $\delta$ 7.2–8.0 indicating non-equivalence of the o,m- and o', m'-protons in this isomer. This suggests an unhindered, co-planar and conjugated conformation between the phenyl and pyrazole rings in (IX). Further support is obtained from the ultraviolet spectrum of (IX) which has a

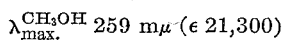

consistent with the adsorption expected for conjugated 1-phenyl-3-substituted pyrazoles. In the 1-pehnyl-5-substituted isomer (VIII) the bulky tetrahydrothebaine substituent adjacent to the pyrazole nitrogen bearing the phenyl substituent hinders this co-planar conformation, and both the nuclear magnetic resonance and ultraviolet (VIII;

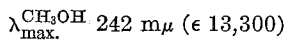

inflection because of end-absorption interference) spectra are consistent.

The condensation solvents may also determine the predominant isomer (IC or ID). For example, when acetic acid is used for the condensation of (IIA) with substituted hydrazines, the 1-aryl(or other substituent)-5-pyrazolyl isomers (IC) are generally obtained substantially free of the other isomer (ID). A modified procedure which produces predominantly the other isomer, the 1-aryl(or other substituent)-3-pyrazolyl compounds (ID) is illustrated as follows. The 7-(2-formyl-1-methoxyvinyl) derivative (IIA) is treated with perchloric acid in methanol, and a keto-ketal (X) (partial structure only shown) intermediate is presumably formed in situ and condensed, without isolation, with an appropriate arylhydrazine such as phenylhydrazine.

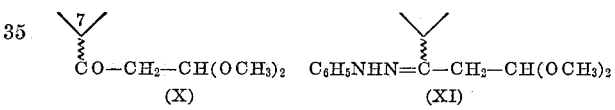

The phenylhydrazone (XI) (partial structure only shown) is then obtained as a crude intermediate, and is cyclized, without further purification, by heating with dilute hydrochloric acid in acetic acid. Additionally, condensation in aqueous hydrochloric acid in some cases produces predominantly the 1-aryl-5-pyrazolyl isomer, and in other cases mixtures in which the 1-aryl-3-pyrazolyl isomer predominates. Well known purification and separation procedures are then used to isolate these isomers. In particular, partition chromatography on Celite® 545 columns is especially useful for purification and separation of the 1-aryl-5(and 3)-pyrazole isomers.

Inherent in the preparation of certain novel oripavine derivatives of the present invention is the transformation of the 3-methoxy substituent on a 7-heterocyclic-6,7,8, 14 - tetrahydro - 6,14 - endoethenothebaine derivative, when desirable. For example, the 3-methoxy derivatives (codide series; IC and ID, $R_1$=$CH_3$) may be transformed to 3-hydroxy derivatives (morphide series; IC and ID, $R_1$=H) by treating with an alkali metal hydroxide in diethylene glycol. The 7-pyrazolyl moiety is unchanged under the conditions of this alkaline hydrolysis.

The novel products of the present invention are useful and valuable as analgesic agents which may show a variety of types of analgesic activity within the general scope of analgesic or anti-nociperceptive actions. These include morphine-like modes of action; non-narcotic analgesic modes of action; and analgesic antagonist modes of action. The overall analgesic activity of a given compound within the scope of the present invention may be readily determined by applying one or more of the routine tests described hereinbelow. The specific type of analgesic activity of a given compound may then be judged by those skilled in the art from the combined results of these several test procedures.

The substituted 7-heterocyclic - 7,8 - dihydro-6-methoxy-6,14-endo(etheno or ethano)codides and morphides (IA and IB) of the present invention are active analgesics when measured by the "writhing syndrome" test for analgesic activity as described by Siegmund et al., Proc. Soc. Exptl. Biol. Med., vol. 95, p. 729 (1957), with modifications. This method is based upon the reduction of the number of writhes following the intraperitoneal injection of one mg./kg. of body weight of phenyl-p-quinone in male Swiss Albino mice weighing 15–25 grams per mouse. The syndrome is characterized by intermittent contractions of the abdomen, twisting and turning of the trunk, and extension of the hind legs beginning 3 to 5 minutes after injection of the phenyl-p-quinone. The test compound is administered orally to groups of two mice each 30 minutes before injection of the phenyl-p-quinone. The total number of writhes exhibited by each group of mice is recorded for a 3 minute period commencing 15 minutes after injection of the phenyl-p-quinone. A compound is considered active if it reduces the total number of writhes in two test mice from a control value of approximately 30 per pair to a value of 18 or less per pair. If desired, the results of this test procedure for 10 pairs of mice at each of several dose levels may be used to determine a median effective dose ($ED_{50}$), defined as the dose required to reduce the number of writhes from about 30 per pair to 18 or less per pair in 50% of the pairs. In a representative operation, and merely by way of illustration, the following compounds of the present invention are active analgesics when tested in this procedure at the indicated oral dose as set forth in Table I below:

determined from the results obtained from several graded dose levels. When tested by this procedure using a "high intensity" heat stimulus calibrated to produce an average 4–6 second response time in untreated animals (controls), certain compounds of the present invention show this type of analgesic activity as indicated by the appropriate median effective doses as set forth in Table II below:

TABLE II

| Compound | $ED_{50}$ mg./kg. of body weight |
|---|---|
| 7α-(5-isoxazolyl)-6,7,8,14-tetrahydro-6,14-endoethenothebaine | Ca. 10 |
| 7α-(1-phenyl-5-pyrazolyl)-6,7,8,14-tetrahydro-6,14-endoethenothebaine | Ca. 3 |
| 7α-[1-(p-fluorophenyl)-5-pyrazolyl]-6,7,8,14-tetrahydro-6,14-endoethenothebaine | Ca. 5 |
| 7α-[1-(4,6-dimethyl-2-s-triazinyl)-5-pyrazolyl]-6,7,8,14-tetrahydro-6,14-endoethenothebaine | Ca. 25 |
| 7α-[1-(2-pyridyl)-5-pyrazolyl]-6,7,8,14-tetrahydro-6,14-endoethenothebaine | Ca. 10 |
| N-cyclopropylmethyl-7α-(1-phenyl-5-pyrazolyl)-6,7,8,14-tetrahydro-6,14-endoethenonororipavine citrate | 0.14 |
| N-cyclopropylmethyl-7α-[1-(m-chlorophenyl)-5-pyrazolyl]-6,7,8,14-tetrahydro-6,14-endoethenonororipavine hydrochloride | 0.32 |
| N-cyclopropylmethyl-7α-[1-(m-fluorophenyl)-5-pyrazolyl]-6,7,8,14-tetrahydro-6,14-endoethenonororipavine hydrochloride | Ca. 0.5 |
| N-cyclopropylmethyl-7α-[1-(m-bromophenyl)-5-pyrazolyl]-6,7,8,14-tetrahydro-6,14-endoethenonororipavine hydrochloride | <3 |
| N-cyclopropylmethyl-7α-[1-(m-tolyl)-5-pyrazolyl]-6,7,8,14-tetrahydro-6,14-endoethenonororipavine hydrochloride | Ca. 0.3 |
| 7α-(1-phenyl-5-pyrazolyl)-6,7,8,14-tetrahydro-6,14-endoethenororipavine | Ca. 0.1 |
| N-cyclopropylmethyl-7α-[1-(m-chlorophenyl)-3-pyrazolyl]-6,7,8,14-tetrahydro-6,14-endoethenonororipavine | Ca. 10 |

Additionally, supplementary routine tests known to those skilled in the art may be carried out to assess the importance of side effects frequently associated with the morphine-like analgesics. These include such actions as onset and duration of action, development of tolerance, respiratory depression, addiction liability, relative effects by oral and parenteral administration, and inhibitory effects on the gastrointestinal system.

Other compounds of this invention may show analgesic antagonist activity when tested against a selected dose of morphine or other morphine-like agents. This antagonist activity may be considered useful as a specific antidote for an overdose of a morphine-like agent, or for its non-narcotic analgesic action. Experience has shown that such narcotic antagonists may also be capable of relieving pain despite the fact that they may be inactive in the rat tail-flick procedure (see above), and have little or no addiction hazard; see L. S. Harris and A. K. Pierson, J. Pharmacol. Exptl. Therap., vol. 143, p. 141 (1964). Analgesics which produce satisfactory pain-relief without serious side effects, particularly with regard to the tolerance,

TABLE I

| Compound | Oral dose mg./kg. of body weight |
|---|---|
| 7α-(5-pyrazolyl)-6,7,8,14-tetrahydro-6,14-endoethenothebaine | 100 |
| 7α-(1-phenyl-5-pyrazolyl)-6,7,8,14-tetrahydro-6,14-endoethenothebaine | 200 |
| 7α-[1-(p-fluorophenyl)-5-pyrazolyl]-6,7,8,14-tetrahydro-6,14-endoethenothebaine | 200 |
| 7α-[1-(4,6-dimethyl-2-s-triazinyl)-5-pyrazolyl]-6,7,8,14-tetrahydro-6,14-endoethenothebaine | 200 |
| 7α[1-(4,6-dimethyl-2-pyrimidinyl)-5-pyrazolyl]-6,7,8,14-tetrahydro-6,14-endoethenothebaine | 200 |
| 7α-[1-(2-pyridyl)-5-pyrazolyl]-6,7,8,14-tetrahydro-6,14-endoethenothebaine | 200 |
| 7α-[1-(2-quinolyl)-5-pyrazolyl]-6,7,8,14-tetrahydro-6,14-endoethenothebaine | 100 |
| 7α-[1-(2-benzothiazolyl)-5-pyrazolyl]-6,7,8,14-tetrahydro-6,14-endoethenothebaine | 200 |
| 7α-(2-amino-4-pyrimidinyl)-6,7,8,14-tetrahydro-6,14-endoethenothebaine | 200 |
| N-cyclopropylmethyl-7α-(5-pyrazolyl)-6,7,8,14-tetrahydro-6,14-endoethenonororthebaine hydrochloride | 25 |
| N-cyclopropylmethyl-7α-(5-isoxazolyl)-6,7,8,14-tetrahydro-6,14-endoethenonororthebaine | 25 |
| N-cyclopropylmethyl-7α-(1-phenyl-5-pyrazolyl)-6,7,8,14-tetrahydro-6,14-endoethenonororipavine citrate | 0.01 ($ED_{50}$) |
| N-cyclopropylmethyl-7α-(1-m-chlorophenyl-5-pyrazolyl)-6,7,8,14-tetrahydro-6,14-endoethenonororipavine hydrochloride | 0.004 ($ED_{50}$) |

A supplementary procedure which also indicates an analgesic mode of action is the rat tail-flick method described by F. E. D'Amour and D. L. Smith, J. Pharmacol. Exptl. Therap., vol. 72, p. 74 (1941), with modifications. The compounds (generally as hydrochloride salts in 0.9% saline) are administered subcutaneously to groups of 5 rats each. Graded doses are given to several groups of rats. These rats are then individually subjected to the heat stimulus from a spot light lamp and a condensing lens focused on the blackened tip of the rat tail. The characteristic response to this presumably painful heat stimulus is to flick the tail out of the concentrated beam of the heat source. The response time (in seconds) is measured for control and treated groups, and the criterion of analgesia is an approximate 100% increase in response time over controls. Established clinically active analgesics such as meperidine, codeine, morphine, etc., are active in the above test. If desired, a median effective dose ($ED_{50}$) for 100% increase in response time over controls may be habituation and drug dependence of the opiates, have been sought for many years.

The narcotic antagonist actions of certain compounds of this invention are demonstrated by a modification of the rat tail-flick method (described above). Graded dose levels of the antagonist compounds are administered subcutaneously to groups of 5 rats each ½ hour after the administration of 10 mg./kg. of morphine subcutaneously, and the response time (in seconds) is measured against the "high intensity" heat stimulus 30 and 60 minutes later. The criterion of antagonist action is a lowering of the response time in animals treated with morphine and antagonist compared to the response time for animals treated with morphine alone (controls; ≧15 seconds). The effective antagonist dose ($DA_{10}$) is defined as the dose of antagonist required to lower the response time from ≧15 seconds to 10 seconds. In a representative operation, and merely by way of illustration, the following compounds are analgesic antagonists when tested by this procedure as set forth in Table III below:

TABLE III

| Compound | Antagonist dose (DA$_{10}$) mg./kg. subcutaneously |
|---|---|
| N-cyclopropylmethyl-7α-(5-pyrazolyl)-6,7,8,14-tetrahydro-6,14-endoethenonorthebaine hydrochloride | 16.5 |
| N-cyclopropylmethyl-7α-(5-isoxazolyl)-6,7,8,14-tetrahydro-6,14-endoethenonorthebaine | 2.7 |
| N-cyclopropylmethyl-7α-(5-pyrazolyl)-6,7,8,14-tetrahydro-6,14-endoethenonororipavine | Ca. 10 |
| N-cyclopropylmethyl-7α-(5-isoxazolyl)-6,7,8,14-tetrahydro-6,14-endoethenonororipavine | <0.35 |
| N-cyclopropylmethyl-7α-(1-phenyl-5-pyrazolyl)-6,7,8,14-tetrahydro-6,14-endoethenonororipavine citrate | 0.8 |
| N-cyclopropylmethyl-7α-[1-(2-pyridyl)-5-pyrazolyl]-6,7,8,14-tetrahydro-6,14-endoethenonororipavine | 0.6 |
| N-cyclopropylmethyl-7α-[1-(p-fluorophenyl)-5-pyrazolyl]-6,7,8,14-tetrahydro-6,14-endoethenonororipavine | 0.4 |
| N-cyclopropylmethyl-7α-(1-phenyl-3-pyrazolyl)-6,7,8,14-tetrahydro-6,14-endoethenonororipavine | Ca. 2 |
| N-cyclopropylmethyl-7α-[1-(2,5-dichlorophenyl)-5-pyrazolyl]-6,7,8,14-tetrahydro-6,14-endoethenonororipavine | Ca. 20 |
| N-cyclopropylmethyl-7α-(1-benzyl-5-pyrazolyl)-6,7,8,14-tetrahydro-6,14-endoethenonororipavine | Ca. 5 |
| N-cyclopropylmethyl-7α-(1-pentafluorophenyl-5-pyrazolyl)-6,7,8,14-tetrahydro-6,14-endoethenonororipavine | Ca. 2 |
| N-cyclopropylmethyl-7α-[1-(o-chlorophenyl)-5-pyrazolyl]-6,7,8,14-tetrahydro-6,14-endoethenonororipavine | Ca. 2 |
| N-cyclopropylmethyl-7α-[1-(p-chlorophenyl)-5-pyrazolyl]-6,7,8,14-tetrahydro-6,14-endoethenonororipavine | Ca. 2 |
| N-cyclopropylmethyl-7α-[1-(m-methoxyphenyl)-5-pyrazolyl]-6,7,8,14-tetrahydro-6,14-endoethenonororipavine | Ca. 1 |
| N-cyclopropylmethyl-7α-[1-(α,α,α-trifluoro-m-tolyl)-5-pyrazolyl]-6,7,8,14-tetrahydro-6,14-endoethenonororipavine | Ca. 5 |
| N-cyclopropylmethyl-7α-[1-(o-fluorophenyl)-5-pyrazolyl]-6,7,8,14-tetrahydro-6,14-endoethenonororipavine | Ca. 1 |
| N-cyclopropylmethyl-7α-[1-(m-nitrophenyl)-5-pyrazolyl]-6,7,8,14-tetrahydro-6,14-endoethenonororipavine | Ca. 5 |

In addition, supplementary test procedures such as measuring the elevation of the pain threshold of rat paws inflamed with brewer's yeast may be carried out to confirm the analgesic action of the novel compounds of the present invention. In certain cases, these compounds also show anti-inflammatory activity.

When mixed with suitable excipients or diluents, the compounds of this invention can be prepared as pills, capsules, tablets, powders, solutions, suspensions and the like for unit dosage and to simplify administration. As analgesics, they will relieve pain by direct action of the nerve centers or by diminishing the conductivity of the sensory nerve fibers. The novel compounds of the present invention may also be administered in combination therapy with salicylates such as aspirin and the like.

The novel compounds of the present invention may exist in several isomeric forms such as stereoisomers. It is to be understood that the present invention includes within its scope all such isomeric forms. For example, the codides used as starting materials have several asymmetric carbon atoms, and epimers at the C–7 asymmetric center are possible. Formation of stereoisomers, or epimers, at C–7 is therefore possible in the products of this invention. The nuclear magnetic resonance spectra of these 7α- and 7β-heterocyclic-7,8-dihydro-6-methoxy-6,14-endo(etheno or ethano)codides and morphides are particularly helpful in characterizing the mixtures of epimers or the substantially pure stereoisomers as obtained from the reaction mixtures or from subsequent purifications and separations. These isomers may then be separated by methods (such as fractional crystallization and partition-chromatography) well known to those skilled in the art.

In accordance with accepted convention, an α-substituent at the 7-position is behind the plane of the paper whereas a β-substituent at the 7-position is in front of the plane of the paper. This is usually represented by a - - - bond for an α-substituent, a — bond for a β-substituent, and a

bond where both are indicated.

The invention will be described in greater detail in conjunction with the following specific examples.

EXAMPLE 1

Preparation of 7α-(5-isoxazolyl)-6,7,8,14-tetrahydro-6,14-endoethenothebaine

7α-(2-formyl-1-methoxyvinyl) - 6,7,8,14 - tetrahydro-6,14-endoethenothebaine (500 mg.), hydroxylamine hydrochloride (500 mg.), and acetic acid (10 ml.) are heated on the steam bath for 1 hour. The reaction mixture is diluted with water and the solution is neutralized with sodium bicarbonate. The mixture is extracted with methylene chloride and the extract is washed with water and dried. The residue obtained by evaporation is crystallized from methanol to give 7α-(5-isoxazolyl)-6,7,8,14-tetrahydro-6,14-endoethenothebaine (430 mg., 90%), M.P. 172–174° C.

EXAMPLE 2

Preparation of 7α-(5 - pyrazolyl) - 6,7,8,14 - tetrahydro-6,14-endoethenothebaine 7α-(2-formyl-1-methoxyvinyl)-6,7,8,14-tetrahydro-6,14-endoethenothebaine (3 g.), acetic acid (60 ml.), and hydrazine hydrate (3 ml.) are heated on the steam bath for 30 minutes and the crude product is isolated as in Example 1. Crystallization from aqueous methanol gives 7α-(5-pyrazolyl) - 6,7,8,14-tetrahydro-6,14-endoethenothebaine (2.8 g., 97%), M.P. 120–122° C. with effervescence.

EXAMPLE 3

Preparation of 7α-(1 - methyl - 5 - pyrazolyl)-6,7,8,14-tetrahydro-6,14-endoethenothebaine 7α - (2 - formyl-1-methoxyvinyl)-6,7,8,14-tetrahydro-6,14-endoethenothebaine (500 mg.), methylhydrazine sulfate (250 mg.), and acetic acid (10 ml.) are heated on the steam bath for 30 minutes. The crude product, isolated as in Example 1, is crystallized from aqueous methanol to give 7α-(1-methyl-5-pyrazolyl)-6,7,8,14-tetrahydro-6,14-endoethenothebaine (300 mg., 60%), M.P. 203–205° C.

EXAMPLE 4

Preparation of 7α - (1 - phenyl - 5 - pyrazolyl)-6,7,8-14-tetrahydro-6,14-endoethenothebaine 7α-(2-formyl - 1 - methoxyvinyl)-6,7,8,14-tetrahydro-6,14-endoethenothebaine (500 mg.), phenylhydrazine hydrochloride (250 mg.) and acetic acid (10 ml.) are heated on the steam bath for 30 minutes. The mixture is diluted with water and then neutralized with aqueous sodium bicarbonate. The material which separated is collected, dried via methylene chloride solution followed by evaporation, and crystallized from aqueous methanol to give 7α-(1-phenyl - 5 - pyrazolyl) - 6,7,8,14 - tetrahydro-6,14-endoethenothebaine (355 mg., 60%), M.P. 175–177° C.

EXAMPLE 5

Preparation of 7α-[1-(p-fluorophenyl)-5-pyrazolyl]-6,7,8,14-tetrahydro-6,14-endoethenothebaine 7α - (2-formyl-1-methoxyvinyl)-6,7,8,14 - tetrahydro-6,14 - endoethenothebaine (500 mg.), p-fluorophenylhydrazine (195 mg.), and acetic acid (10 ml.) are heated on the steam bath for 1 hour. The crude product is isolated in the same manner as in Example 1 and crystallization from methanol gives 7α-[1-(p-fluorophenyl)-5-pyrazolyl]-6,7,8,14-tetrahydro - 6,14 - endoethenothebaine (410 mg., 70%), M.P. 211–213° C.

EXAMPLE 6

Preparation of 7α - [1 - (4,6 - dimethyl - 2 - s-triazinyl)-5-pyrazolyl]-6,7,8,14-tetrahydro-6,14-endoethenothebaine 7α-(2 - formyl - 1 - methoxyvinyl)-6,7,8,14-tetrahydro-6,14 - endoethenothebaine (725 mg.), 2-hydrazino-4,6- dimethyl-s-triazine (240 mg.), and acetic acid (15 ml.) are heated on the steam bath for 1 hour. The crude product is isolated in the same manner as in Example 1 and crystallization from ethyl acetate-n-hexane gives 7α-[1-(4,6-dimethyl-2-s-triazinyl) - 5 - pyrazolyl]-6,7,8,14-tetrahydro - 6,14 - endoethenothebaine (500 mg., 57%) M.P. 182–185° C. (inserted at 140° C.).

EXAMPLE 7

Preparation of 7α-[1-(4,6-dimethyl-2-pyrimidinyl)-5-pyrazolyl]-6,7,8,14-tetrahydro-6,14-endoethenothebaine 7α-(2-formyl - 1 - methoxyvinyl - 6,7,8,14 - tetrahydro-6,14-endoethenothebaine (1 g.), 2-hydrazino-4,6-dimethylpyrimidine (500 mg.), and acetic acid (20 ml.) are heated under reflux for 1½ hours. The crude product, isolated in the same manner as in Example 1, is heated with water (50 ml.) on the steam bath to remove the excess of 2-hydrazino-4,6-dimethylpyrimidine which is water-soluble. The solid is collected and a solution in methylene chloride is dried and passed through a short column of Magnesol®. Evaporation of the eluate followed by crystallization of the residue from acetone-n-hexane gives 7α-[1-(4,6-dimethyl - 2 - pyrimidinyl) - 5 - pyrazolyl] - 6,7,8,14-tetrahydra - 6,14 - endoethenothebaine (670 mg., 55%), M.P. 194–198° C.

EXAMPLE 8

Preparation of 7α - [1-(2-pyridyl)-5-pyrazolyl]-6,7,8,14-tetrahydro-6,14-endoethenothebaine 7α-(2-formyl - 1 - methoxyvinyl) - 6,7,8,14 - tetrahydro-6,14-endoethenothebaine (500 mg.), 2-hydrazinopyridine (250 mg.), and acetic acid (10 ml.) are heated under reflux for 1½ hours. The crude product is obtained as in Example 7 and crystallization from acetone-n-hexane gives 7α-[1-(2 - pyridyl)-5-pyrazolyl]-6,7,8,14-tetrahydro-6,14-endoethenothebaine (360 mg., 70%), M.P. 156–158° C.

EXAMPLE 9

Preparation of 7α-[1-(2-quinolyl)-5-pyrazolyl]-6,7,8,14-tetrahydro-6,14-endoethenothebaine 7α-(2-formyl - 1 - methoxyvinyl)-6,7,8,14-tetrahydro-6,14-endoethenothebaine (500 mg.), 2-hydrazinoquinoline (188 mg.), and acetic acid (10 ml.) are heated under reflux for 1 hour. The crude product is obtained as in Example 1 and crystallization from methanol gives 7α-[1-(2-quinolyl) - 5 - pyrazolyl]-6,7,8,14-tetrahydro-6,14-endoethenothebaine (440 mg.), M.P. 116–120° C.

EXAMPLE 10

Preparation of 7α - [1 - (2-benzothiazolyl)-5-pyrazolyl]-6,7,8,14-tetrahydro-6,14-endoethenothebaine 7α-(2-formyl - 1 - methoxyvinyl)-6,7,8,14-tetrahydro-6,14-endoethenothebaine (1 g.), 2-hydrazinobenzothiazole (400 mg.), and acetic acid (20 ml.) are heated under reflux for 1 hour. The crude product is obtained as in Example 1 and crystallization from methylene chloride-methanol gives 7α - [1-(2-benzothiazolyl)-5-pyrazolyl]-6,7,8,14-tetrahydro - 6,14 - endoethenothebaine (1.1 g.), M.P. 209–211° C.

EXAMPLE 11

Preparation of 7α-(2-amino-4-pyrimidinyl)-6,7,8,14-tetrahydro-6,14-endoethenothebaine 7α-(2-formyl - 1 - methoxyvinyl)-6,7,8,14-tetrahydro-6,14-endoethenothebaine (1 g.), guanidine carbonate (500 mg.), and ethanol (100 ml.) are heated under reflux for 48 hours. The cooled mixture is filtered and solvent is evaporated. The residue is collected with the aid of water and crystallization from aqueous methanol gives 7α-(2-amino - 4 - pyrimidinyl)-6,7,8,14-tetrahydro-6,14-endoethenothebaine (700 mg., 70%), M.P. 175–178° C.

EXAMPLE 12

Preparation of N-cyclopropylmethyl-7α-(5-pyrazolyl)-6,7,8,14-tetrahydro-6,14-endoethenonorthebaine hydrochloride N-cyclopropylmethyl-7α-(2 - formyl-1-methoxyvinyl)-6,7,8,14 - tetrahydro-6,14-endoethenonorthebaine hydrochloride (2 g.), hydrazine hydrate (2 ml.) and acetic acid (40 ml.) are heated on the steam bath for 30 min. The mixture is diluted with water and neutralized with powdered sodium bicarbonate. The mixture is extracted with methylene chloride and the extract is washed with water and dried. Evaporation of solvent gives a gum which is dissolved in dilute hydrochloric acid (5%) and the solution is washed with ether. The aqueous phase is neutralized with powdered sodium bicarbonate and the material which separates is collected and dried. Crystallization from methylene chloride-methanol-acetone gives N-cyclopropylmethyl-7α-(5 - pyrazolyl)-6,7,8,14-tetrahydro-6,14-endoethenonorthebaine hydrochloride (400 mg.), M.P. 303–305° C. dec. The mother liquor is evaporated and the residue is treated with dilute hydrochloric acid and then with sodium bicarbonate as before. The material which separates is collected, washed with acetone, and dried to give a further amount (450 mg.) of product, M.P. 302–305° C., and a total yield of 45%.

EXAMPLE 13

Preparation of N-cyclopropylmethyl-7α-(5-isoxazolyl)-6,7,8,14-tetrahydro-6,14-endoethenonorthebaine N-cyclopropylmethyl-7α-(2 - formyl-1-methoxyvinyl)-6,7,8,14 - tetrahydro-6,14-endoethenonorthebaine hydrochloride (1 g.), hydroxylamine hydrochloride (1 g.), and acetic acid (20 ml.) are heated on the steam bath for 1 hr. After the addition of water, the mixture is neutralized with powdered sodium bicarbonate and extracted with methylene chloride. The extract is washed with water and dried. Evaporation of solvent gives a gum, a solution of which in methylene chloride is passed through a short column of Magnesol®. The eluate is evaporated and the residue crystallized from methanol to give N-cyclopropylmethyl-7α-(5-isoxazolyl) - 6,7,8,14 - tetrahydro-6,14-endoethenonorthebaine (500 mg., 56%), M.P. 144–146° C.

EXAMPLE 14

Preparation of N-cyclopropylmethyl-7α-(5-pyrazolyl)-6,7,8,14-tetrahydro-6,14-endoethenonororipavine N-cyclopropylmethyl-7α-(2 - formyl-1-methoxyvinyl)-6,7,8,14-tetrahydro-6,14-endoethenonororipavine (1 g.) hydrazine hydrate (1 ml.), and acetic acid (20 ml.) are heated on the steam bath for 30 min. The mixture is diluted with water and is then basified with ammonium hydroxide. The material which separates is collected, dried, and crystallized from acetone-n-hexane to give N-cyclopropylmethyl-7α-(5 - pyrazolyl)-6,7,8,14-tetrahydro-6,14-endoethenonororipavine (380 mg., 40%), M.P. 198–200° C.

EXAMPLE 15

Preparation of N-cyclopropylmethyl-7α-(5-isoxazolyl)-6,7,8,14-tetrahydro-6,14-endoethenonororipavine N-cyclopropylmethyl - 7α-(2-formyl-1-methoxyvinyl)-6,7,8,14-tetrahydro-6,14-endoethenonororipavine (1 g.), hydroxylamine hydrochloride (1 g.), and acetic acid (20 ml.) are heated on the steam bath for 1 hr. The mixture is diluted with water and is then neutralized with aqueous sodium bicarbonate. The precipitated product is extracted into methylene chloride, and the extract is washed with water and dried. Evaporation of solvent gives a gum, a solution of which in methylene chloride is passed through a short column of Magnesol®. The eluate is evaporated and the residue collected with the aid of ether. Crystallization from acetone-n-hexane gives N-cyclopropylmethyl - 7α - (5-isoxazolyl) - 6,7,8,14 - tetrahydro - 6,14 - endoethenonororipavine (280 mg.), M.P. 182–184° C. An additional amount (50 mg.), M.P. 185–186° C., was obtained from the mother liquor to give a total yield of 35%.

EXAMPLE 16

Preparation of N-cyclopropylmethyl-7α-(1-phenyl-5-pyrazolyl) - 6,7,8,14 - tetrahydro-6,14-endoethenonorthebaine hydrochloride N-cyclopropylmethyl-7α-(2 - formyl-1-methoxyvinyl)-6,7,8,14-tetrahydro-6,14-endoethenonorthebaine (5 g.), phenyl hydrazine hydrochloride (2.5 g.), and acetic acid (10 ml.) are heated on the steam bath for 30 min. The mixture is diluted with water and is then basified with ammonium hydroxide. The material which separates is collected and dried via methylene chloride solution. The residue obtained by evaporation of solvent is dissolved in methylene chloride and the solution is passed through a short column of Magnesol ®. The eluate is evaporated to give a gum. A portion of this gum (500 mg.) is dissolved in methanol, and dilute hydrochloric acid (5%) is added in excess. The solution is extracted with methylene chloride and the extract is dried and evaporated. The residue is collected with the aid of acetone and crystallized from methanol-acetone to give N-cyclopropylmethyl-7α-(1-phenyl - 5 - pyrazolyl) - 6,7,8,14 - tetrahydro - 6,14-endoethenonorthebaine hydrochloride (250 mg.), M.P. 272–274° C. dec. The remainder of the above gum is treated in a similar fashion to give further amounts (1.147 g. and 1.243 g.), M.P. 274° dec. and M.P. 277° C. dec., respectively, and a total yield of 39%.

EXAMPLE 17

Preparation of N-cyclopropylmethyl-7α-(1-phenyl-5-pyrazolyl) - 6,7,8,14 - tetrahydro - 6,14 - endoethenonororipavine citrate N-cyclopropylmethyl - 7α - (2-formyl - 1 - methoxyvinyl)-6,7,8,14-tetrahydro - 6,14 - endoethenonororipavine (5 g.), phenylhydrazine hydrochloride (2.5 g.), and acetic acid (100 ml.) are heated on the steam bath for 30 min. The mixture is diluted with water and is then made basic with ammonium hydroxide. The material which separates is collected and dried via methylene chloride solution followed by evaporation of solvent to give a glass. A solution of this glass in methylene chloride is passed through a short column of Magnesol ®. Evaporation of the eluate gives a gum which crystallizes on the addition of ether, and is collected with the aid of ether to give N-cyclopropylmethyl-7α-(1-phenyl-5-pyrazolyl) - 6,7,8,14-tetrahydro-6,14-endoethenonororipavine (2.8 g., 43%), M.P. 184–186° C. The compound has $\lambda_{max.}^{CH_3OH}$ 242 (inflection point; ε 13,300) and 289 mμ (ε 9000)

A hot solution of citric acid (1.5 g.) in ethanol (5 ml.) is added to a hot solution of pyrazole (1.5 g.) in ethanol (15 ml). N-cyclopropylmethyl-7α-(1-phenyl-5-pyrazolyl) - 6,7,8,14 - tetrahydro - 6,14 - endoethenonororipavine citrate (1.416 g.), M.P. 216° C. dec., separates on standing for several hours. The mother liquor is warmed and ether is added, when a further amount (450 mg.) of product, M.P. 217° C. dec., separates to give a total yield of 98%. The compound has $\lambda_{max.}^{KBr.}$ 2.93, 3.85 (broad), 5.74, 5.82 (shoulder), and 6.25μ nuclear magnetic resonance (d$_6$-DMSO) δ7.50 and 6.13 (pyrazole C$_3'$—H and C$_4'$—H, doublets, J$_{3',4'}$=1.8 c.p.s.), 5.83 and 5.72 (C$_{18}$—H and C$_{17}$—H; doublets, J$_{17,18}$=9 c.p.s.), 4.48 (C$_5$—H), 3.08 (C$_6$-methoxyl), and 2.70 (—CH$_2$—of citrate; 2 protons or one mole of citric acid per mole of thebaine derivative).

EXAMPLE 18

Preparation of 7α(5-isoxazolyl)-6,7,8,14-tetrahydro-6,14-endoethenoripavine

Following the general procedure of Example 1, 7α-(2-formyl-1-methoxyvinyl)-6,7,8,14-tetrahydro - 6,14 - endoethenoripavine is treated with hydroxylamine hydrochloride in acetic acid to give 7α-(5-isoxazolyl)-6,7,8,14-tetrahydro-6,14-endoethenoripavine.

EXAMPLE 19

Preparation of 7α-(5-pyrazolyl)-6,7,8,14-tetrahydro-6,14-endoethenoripavine

Following the general procedure of Example 2, 7α-(2-formyl-1-methoxyvinyl)-6,7,8,14-tetrahydro - 6,14 - endoethenoripavine is treated with hydrazine hydrate in acetic acid to give 7α-(5-pyrazolyl)-6,7,8,14-tetrahydro-6,14-endoethenoripavine.

EXAMPLE 20

Preparation of 3-acetyl-N-cyclopropylmethyl-7α-(5-isoxazolyl)-6,7,8,14-tetrahydro - 6,14 - endoethenonororipavine Acetylation of N-cyclopropylmethyl-7α-(5-isoxazolyl)-6,7,8,14-tetrahydro - 6,14 - endoethenonororipavine using acetic anhydride in pyridine gives 3-acetyl-N-cyclopropylmethyl-7α-(5-isoxazolyl)-6,7,8,14-tetrahydro - 6,14 - endoethenonororipavine.

EXAMPLE 21

Preparation of 7α-(5-isoxazolyl)-6,7,8,14-tetrahydro-6,14-endoethenonorthebaine

Following the general procedure of Example 1, 7α-(2-formyl-1-methoxyvinyl)-6,7,8,14-tetrahydro - 6,14 - endoethenonorthebaine is treated with hydroxylamine hydrochloride in acetic acid to give 7α-(5-isoxazolyl)-6,7,8,14-tetrahydro-6,14-endoethenonorthebaine.

EXAMPLE 22

Preparation of N-allyl-7α-(5-isoxazolyl)-6,7,8,14-tetrahydro-6,14-endoethenonorthebaine 7α - (5 - isoxazolyl) - 6,7,8,14 - tetrahydro - 6,14 - endoethenonorthebaine is treated with allyl bromide in an inert solvent to give N-allyl 7α-(5-isoxazolyl)-6,7,8,14-tetrahydro-6,14-endoethenonorthebaine.

EXAMPLE 23

Preparation of 7α-(5-isoxazolyl)-N-propyl-6,7,8,14-tetrahydro-6,14-endoethenonorthebaine 7α-(5-isoxazolyl)-6,7,8,14-tetrahydro - 6,14 - endoethenonorthebaine is treated with propyl bromide in an inert solvent to give 7α-(5-isoxazolyl)-N-propyl-6,7,8,14-tetrahydro-6,14-endoethenonorthebaine.

EXAMPLE 24

Preparation of 7α-(5-isozazolyl)-N-phenethyl-6,7,8,14-tetrahydro-6,14-endoethenonorthebaine 7α-(5-isoxazolyl)-6,7,8,14-tetrahydro-6,14 - endothenonorthebaine is treated with phenethyl chloride in an inert solvent to give 7α-(5-isoxazolyl)-N-phenethyl-6,7,8,14-tetrahydro-6,14-endoethenonorthebaine.

EXAMPLE 25

Preparation of 7α-(5-isoxazolyl)-N-(3-methyl-2-buten-1-yl)-6,7,8,14-tetrahydro-6,14-endoethenonorthebaine 7α-(5-isoxazolyl)-6,7,8,14-tetrahydro - 6,14 - endoethenonorthebaine is treated with 3-methyl-2-buten-1-yl bromide in an inert solvent to give 7α-(5-isoxazolyl)-N-(3-methyl-2-buten-1-yl)-6,7,8,14-tetrahydro - 6,14 - endothenonorthebaine.

EXAMPLE 26

Preparation of 7α-(5-isoxazolyl)-N-propargyl-6,7,8,14-tetrahydro-6,14-endoethenonorthebaine 7α-(5-isoxazolyl)-6,7,8,14-tetrahydro - 6,14 - endoethenonorthebaine is treated with propargyl bromide in an inert solvent to give 7α-(5-isoxazolyl)-N-propargyl-6,7,8,14-tetrahydro-6,14-endotthenonorthebaine.

EXAMPLE 27

Preparation of 7α-(4-ethyl-5-pyrazolyl)-6,7,8,14-tetrahydro-6,14-endoethenothebaine Following the general procedure of Example 2, 7α-(2-formyl-1-methoxy-1-buteneyl)-6,7,8,14 - tetrahydro - 6,14-endoethenothebaine is treated with hydrazine hydrate in acetic acid to give 7α-(4-ethyl-5-pyrazolyl)-6,7,8,14-tetrahydro-6,14-endoethenothebaine.

EXAMPLE 28

Preparation of 7α-(5-isoxazolyl)-6,7,8,14-tetrahydro-6,14-endoethanothebaine

Following the general procedure of Example 1, 7α-(2-formyl-1-methoxyvinyl)-6,7,8,14-tetrahydro - 6,14 - endoethanothebaine is treated with hydroxylamine hydrochloride in acetic acid to give 7α-(5-isoxazolyl)-6,7,8,14-tetrahydro-6,14-endoethanothebaine.

EXAMPLE 29

Preparation of 7β-(5-pyrozolyl)-6,7,8,14-tetrahydro-6,14-endoethenothebaine

Following the general procedure of Example 2, 7β-(2-formyl-1-methoxyvinyl)-6,7,8,14-tetrahydro - 6,14 - endothenothebaine is treated with hydrazine hydrate in acetic acid to give 7β-(5-pyrazolyl)-6,7,8,14-tetrahydro-6,14-endoethenothebaine.

EXAMPLE 30

Preparation of 7α-(4-isobutyl-1-phenyl-5-pyrazolyl)-6,7,8,14-tetrahydro-6,14-endoethenothebaine Following the general procedure of Example 2, 7α-(2-formyl-1-methoxy-4-methyl - 1 - penten - 1 - yl) - 6,7,8,14-tetrahydro-6,14-endoethenothebaine is treated with phenylhydrazine hydrate in acetic acid to give 7α-(4-isobutyl-1-phenyl-5-pyrazolyl)-6,7,8,14 - tetrahydro - 6,14 - endoethenothebaine.

EXAMPLE 31

Preparation of N-cyano-7α-(5-isoxazolyl)-6,7,8,14-tetrahydro-6,14-endoethenonorthebaine Following the general procedure of Example 1, N-cyano-7α-(2-formyl-1-methoxyvinyl) - 6,7,8,14 - tetrahydro-6,14-endoethenonorthebaine is treated with hydroxylamine hydrochloride in acetic acid to give N-cyano-7α-(5-isoxazolyl)-6,7,8,14-tetrahydro - 6,14 - endoethenonorthebaine.

EXAMPLE 32

Preparation of N-cyclopropylmethyl-7α-[1-(m-chlorophenyl) - 5 - pyrazolyl)] - 6,7,8,14 - tetrahydro - 6,14-endoethenonororipavine Following the general procedure of Example 17, N-cyclopropylmethyl - 7α - (2 - formyl-1-methoxyvinyl)-6,7,8,14-tetrahydro-6,14-endoethenonororipavine is treated with m-chlorophenyl hydrazine hydrochloride in acetic acid to give N-cyclopropylmethyl-7α-[1-(m-chlorophenyl) - 5 - pyrazolyl)] - 6,7,8,14 - tetrahydro-6,14-endoethenonororipavine. The hydrochloride crystallizes from ethanol and has M.P. 281–282° C. dec. The compound has nuclear magnetic resonance (CDCl$_3$/d$_6$-DMSO)δ 7.48 and 6.08 (pyrazole C$_3'$—H and C$_4'$—H, doublets, J$_{3',4'}$=1.7 c.p.s.).

EXAMPLE 33

Preparation of N - cyclopropylmethyl-7α-[1-(2-pyridyl)-5 - pyrazolyl] - 6,7,8,14 - tetrahydro - 6,14 - endoethenonororipavine Following the general procedure of Example 17, N-cyclopropylmethyl - 7α - (2 - formyl-1-methoxyvinyl)-6,7,8,14 - tetrahydro - 6,14-endoethenonororipavine is treated with 2-hydrazinopyridine in acetic acid to give N-cyclopropylmethyl - 7α - [1-(2-pyridyl)-5-pyrazolyl]-6,7,8,14 - tetrahydro - 6,14 - endoethenonororipavine. The compound is crystallized from acetone-n-hexane and has M.P. 136–138° C.

EXAMPLE 34

Preparation of N-cyclopropylmethyl-7α-[1-(p-fluorophenyl) - 5 - pyrazolyl] - 6,7,8,14 - tetrahydro-6,14-endoethenonororipavine N - cyclopropylmethyl - 7α - (2-formyl-1-methoxyvinyl) - 6,7,8,14-tetrahydro-6,14-endoethenonororipavine (1.4 g.), p-fluorophenylhydrazine hydrochloride (700 mg.), and acetic acid (40 ml.) are heated on the steam bath for 1 hr. The cooled mixture is diluted with water and neutralized with dilute ammonium hydroxide. The material which separates is collected and dried. A solution of this material in methylene chloride is passed through a short column of Magnesol® and evaporation of the eluate followed by crystallization of the residue from acetone-n-hexane gives N-cyclopropylmethyl-7α-[1-(p-fluorophenyl) - 5 - pyrazolyl] - 6,7,8,14-tetrahydro-6,14-endoethenonororipavine (1.038 g.), M.P. 151–153° C.

EXAMPLE 35

Preparation of N - cyclopropylmethyl - 7α - (1-phenyl-3-pyrazolyl)-6,7,8,14-tetrahydro-6,14-endothenonororipavine N - cyclopropylmethyl - 7α - (2 - formyl - 1 - methoxyvinyl) - 6,7,8,14 - tetrahydro - 6,14 - endoethenonororipavine (1 g.), methanol (25 ml.), and perchloric acid (0.4 ml.) are heated under reflux for 1½ hours. Phenylhydrazine (1 ml.) is then added and the mixture is heated under reflux for 1 hr. The solution is then added dropwise with stirring, to an excess of aqueous sodium bicarbonate and the material which separates is collected and dried (72.8 mg.);

$$\lambda_{max.}^{KBr.} \text{ 6.28, 8.99 and 9.09}\mu$$

The above material (540 mg.) without further purification, is heated on the steam bath with acetic acid (5 ml.) and dilute hydrochloric acid (5 ml.; 5%) for 1 hr. This solution is added dropwise, with stirring, to dilute ammonium hydroxide (20% v./v.) and the material which separates is collected and dried. A solution of this material in methylene chloride is passed through a short column of Magnesol® and the eluate is evaporated to give a gum. Citric acid (540 mg.) is added to a solution of this gum in ethanol (5 ml.) and the mixture is heated on the steam bath until solution takes place. This solution is poured into ether with stirring and the material which separates is collected and crystallized from ethyl acetate to give N-cyclopropylmethyl-7α-(1-phenyl-3-pyrazolyl)-6,7,8,14 - tetrahydro - 6,14 - endoethenonororipavine citrate (140 mg.), M.P. indefinite from 90–140° C. This compound has nuclear magnetic resonance (d$_6$-DMSO)δ 8.25 and 6.17 (pyrazole C$_5'$—H and C$_4'$—H; doublets, J$_{4',5'}$=2.5 c.p.s.), 5.63 (C$_{17}$—H and C$_{18}$—H; singlet), 4.87 (C$_5$—H), 3.37 (C$_6$-methoxyl), 2.70 (—CH$_2$— of citrate; 2 protons or one mole of citric acid per mole of thebaine derivative); peaks at δ 4.47 (C$_5$—H) and 3.06 (C$_6$-methoxyl) indicate the presence of ca. 15% of the 7α-(1-phenyl-5-pyrazolyl)isomer.

The mother liquor from this citrate is evaporated, and the residue is dissolved in a little methanol. This solution is added dropwise, with stirring, to dilute ammonium hydroxide (20% v./v.) and the material which separates is collected and dried. This material (ca. 220 mg.) is subjected to partition chromatography on Celite® 545 using the solvent system heptane:ethyl acetate:methanol:water (95:5:17:4). The eluate is monitored at 230 mμ. The main peak (Cut 6) is evaporated, and the residue is dissolved in acetone. n-Hexane is then added to turbidity and the solvent allowed to evaporate at room temperature. The residue (100 mg.), M.P. 143–145° C., is collected. This pure isomer has

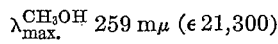 259 mμ (ε 21,300)

and nuclear magnetic resonance δ 7.72 and 6.17 (pyrazole $C_{5'}$—H and $C_{4'}$—H; doublets, $J_{4',5'}$=2.3 c.p.s.), 7.45 (N-phenyl; multiplet), 4.75 ($C_5$—H), and 3.42 ($C_6$-methoxyl), 2.33 (doublet, J=5.5 c.p.s. N—$CH_2$—Δ)

EXAMPLE 36

Preparation of N-cyclopropylmethyl-7α-[1-(2,5-dichlorophenyl) - 5 - pyrazolyl] - 6,7,8,14 - tetrahydro - 6,14-endoethenonororipavine A hot solution of 2,5-dichlorophenylhydrazine (500 mg.) in dilute hydrochloric acid (20 ml.; 5%) is added dropwise with stirring to a hot solution of N-cyclopropylmethyl - 7α - (2 - formyl-1-methoxyvinyl)-6,7,8,14-tetrahydro-6,14-endoethenonororipavine (1 g.) in dilute hydrochloric acid (10 ml.; 5%). After the addition is completed, the reaction mixture is stirred for 20 min., and extracted with methylene chloride (and a little methanol is used to dissolve material adhering to the flask). The extract is shaken with dilute ammonium hydroxide (20% v./v.), then with water, and dried. The dried methylene chloride solution is passed through a short column of Magnesol® and the column finally washed with ether. The eluate is evaporated and, after crystallization of the residue from acetone-n-hexane, N-cyclopropylmethyl-7α-[1-(2,5-dichlorophenyl) - 5 - pyrazolyl] - 6,7,8,14 - tetrahydro-6,14-endoethenonororipavine (700 mg.), M.P. 161–163° C. (with effervescence) is obtained. The compound has nuclear magnetic resonance (CDCl₃)δ 7.57 and 6.10 (pyrazole $C_{3'}$—H and $C_{4'}$—H, doublets, $J_{3',4'}$=1.8 c.p.s.), 4.25 ($C_5$—H), 3.27 ($C_6$-methoxyl).

EXAMPLE 37

Preparation of N - cyclopropylmethyl - 7α - (1-benzyl-5-pyrazolyl) - 6,7,8,14 - tetrahydro - 6,14 - endoethenonororipavine Following the general procedure of Example 17, N-cyclopropylmethyl - 7α - (2-formyl - 1 - methoxyvinyl) - 6, 7,8,14 - tetrahydro - 6,14 - endoethenonororipavine is treated with benzylhydrazine hydrochloride in acetic acid to give N-cyclopropylmethyl-7α-(1-benzyl-5-pyrazolyl)-6, 7,8,14 - tetrahydro - 6,14 - endoethenonororipavine. The compound is crystallized from ethanol and has M.P. 195–197° C.

EXAMPLE 38

Preparation of N - cyclopropylmethyl - 7α - (1 - pentafluorophenyl - 5 - pyrazolyl) - 6,7,8,14 - tetrahydro - 6, 14-endoethenonororipavine Following the general procedure of Example 17, N-cyclopropylmethyl - 7α - (2-formyl - 1 - methoxyvinyl)-6,7, 8,14 - tetrahydro - 6,14-endoethenonororipavine is treated with pentafluorophenylhydrazine hydrochloride in acetic acid to give N-cyclopropylmethyl-7α-(1-pentafluorophenyl - 5 - pyrazolyl) - 6,7,8,14-tetrahydro-6,14-endoethenonororipavine. The compound is crystallized from n-hexane and has M.P. 211–213° C.

EXAMPLE 39

Preparation of N - cyclopropylmethyl-7α-[1-(p-chlorophenyl - 3 - pyrazolyl) - 6,7,8,14 tetrahydro-6,14-endoethenonororipavine A hot solution of p-chlorophenylhydrazine hydrochloride (500 mg.) in dilute hydrochloric acid (20 ml.; 5%) is added dropwise, with stirring, to a hot solution of N-cyclopropylmethyl - 7α - (2 - formyl - 1 - methoxyvinyl - 6,7,8,14 - tetrahydro - 6,14 - endoethenonororipavine (1 g.) in dilute hydrochloric acid (10 ml.; 5%). The mixture is stirred for 20 min. after the addition is complete and is then extracted with methylene chloride. The extract is washed with dilute ammonium hydroxide (20% v./v.), water, and then dried. The solution is passed through a short column of Magnesol® and the eluate is evaporated to give N-cyclopropylmethyl-7-α-[1-p-chlorophenyl)-3-pyrazolyl] - 6,7,8,14 - tetrahydro - 6,14-endoethenonororipavine as a gum (790 mg.) having

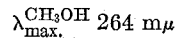 264 mμ

EXAMPLE 40

Preparation of N - cyclopropylmethyl - 7α - [1 - (m-chlorophenyl) - 3 - pyrazolyl] - 6,7,8,14 - tetrahydro-6, 14-endoethenonororipavine Following the general procedure of Example 39, N-cyclopropylmethyl - 7α - (2 - formyl - 1 - methoxyvinyl)-6,7,8,14 - tetrahydro - 6,14 - endoethanonororipavine is treated with m-chlorophenylhydrazine in dilute hydrochloric acid to give N-cyclopropylmethyl-7α-[1-(m-chlorophenyl)-3-pyrazolyl] - 6,7,8,14 - tetrahydro - 6,14-endoethenonororipavine hydrochloride after separation and purification from the 7α-[1-(m-chlorophenyl-5-pyrazolyl] isomer by partition chromatography. The compound has

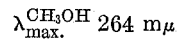 264 mμ nuclear magnetic resonance (d₆-DMSO)δ 8.40 and 6.20 (pyrazole $C_{5'}$—H and $C_{4'}$—H; doublets, $J_{4',5'}$=2–2.5 c.p.s.), 5.86 ($C_{17}$—H and $C_{18}$—H; singlet) 5.02 ($C_5$—H), 3.38 ($C_6$—methoxyl).

EXAMPLE 41

Preparation of N - cyclopropylmethyl - 7α - [1 - (o-chlorophenyl) - 5 - pyrazolyl] - 6,7,8,14 - tetrahydro - 6,14-endoethenonororipavine Following the general procedure of Example 17, N-cyclopropylmethyl - 7α - (2 - formyl - 1 - methoxyvinyl)-6,7,8,14 - tetrahydro - 6,14 - endoethenonororipavine is treated with o-chlorophenyl hydrazine hydrochloride in acetic acid to give N-cyclopropylmethyl - 7α - [1 - (o-chlorophenyl) - 5 - pyrazolyl] - 6,7,8,14 - tetrahydro-6,14-endoethenonororipavine, M.P. 226–228° C., after crystallization from acetone-hexane.

EXAMPLE 42

Preparation of N - cyclopropylmethyl - 7α - [1 - (p-chlorophenyl) - 5 - pyrazolyl] - 6,7,8,14 - tetrahydro-6,14-endoethenonororipavine Following the general procedure of Example 17, N-cyclopropylmethyl - 7α - (2 - formyl - 1 - methoxyvinyl)-6,7,8,14-tetrahydro - 6,14 - endoethenonororipavine is treated with p-chlorophenyl hydrazine hydrochloride in acetic acid to give N-cyclopropylmethyl-7α-[1-p-chlorophenyl) - 5 - pyrazolyl] - 6,7,8,14 - tetrahydro - 6,14-endoethenonororipavine, M.P. 147–149° C., after crystallization from acetone-hexane.

EXAMPLE 43

Preparation of N - cyclopropylmethyl - 7α - [1 - (m-fluorophenyl ) - 5 - pyrazolyl] - 6,7,8,14 - tetrahydro-6,14-endoethenonororipavine Following the general procedure of Example 17, N-cyclopropylmethyl - 7α - (2 - formyl - 1 - methoxyvinyl)-6,7,8,14 - tetrahydro - 6,14 -endoethenonororipavine is treated with m-fluorophenylhydrazine hydrochloride in acetic acid to give N - cyclopropylmethyl - 7α - [1-(m-fluorophenyl) - 5 - pyrazolyl] - 6,7,8,14 - tetrahydro - 6,14-endoethenonororipavine. The hydrochloride salt has M.P. 274–276° C. dec., after crystallization from ethanol-ether.

EXAMPLE 44

Preparation of N - cyclopropylmethyl - 7α - [1 - methoxyphenyl) - 5 - pyrazolyl] - 6,7,8,14 - tetrahydro - 6,14-endoethenonororipavine Following the general procedure of Example 17, N-cyclopropylmethyl - 7α - (2 - formyl - 1 - methoxyvinyl)-6,7,8,14 - tetrahydro - 6,14 - endoethenonororipavine is treated with m-methoxyphenylhydrazine hydrochloride in acetic acid to give N - cyclopropylmethyl - 7α - [1 - (m-methoxyphenyl) - 5 - pyrazolyl] - 6,7,8,14 - tetrahydro-6,14 - endoethenonororipavine, M.P. 181–183° C., after crystallization from acetone-hexane.

EXAMPLE 45

Preparation of N - cyclopropylmethyl - 7α - [1 - (m-bromophenyl) - 5 - pyrazolyl] - 6,7,8,14 - tetrahydro-6,14-endoethenonororipavine Following the general procedure of Example 17, N-cyclopropylmethyl - 7α - (2 - formyl - 1 - methoxyvinyl)-6,7,8,14 - tetrahydro - 6,14 - endoethenonororipavine is treated with m-bromophenylhydrazine hydrochloride in acetic acid to give N-cyclopropylmethyl-7α-[1-(m-bromophenyl) - 5 - pyrazolyl] - 6,7,8,14 - tetrahydro - 6,14-endoethenonororipavine. The hydrochloride salt has M.P. 283–284° C. dec., after crystallization from ethanol.

EXAMPLE 46

Preparation of N - cyclopropylmethyl - 7α - [1 - (α,α,α-trifluoro - m - tolyl) - 5 - pyrazolyl] - 6,7,8,14 - tetrahydro-6,14-endoethenonororipavine Following the general procedure of Example 4, N-cyclopropylmethyl - 7α - (2 - formyl - 1 - methoxyvinyl)-6,7,8,14 - tetrahydro - 6,14 - endoethenonororipavine is treated with α,α,α - trifluoro-m-tolylhydrazine hydrochloride in acetic acid to give N-cyclopropylmethyl-7α[1-(α,α,α - trifluoro - m - tolyl) - 5 - pyrazolyl] - 6,7,8,14-tetrahydro-6,14 - endoethenonororipavine. M.P. 145–146° C., after crystallization from acetone-hexane.

EXAMPLE 47

Preparation of N - cyclopropylmethyl - 7α - [1-(m-tolyl)-5 - pyrazolyl] - 6,7,8,14 - tetrahydro- 6,14 - endoethenonororipavine Following the general procedure of Example 4, N-cylcopropylmethyl - 7α- (2 - formyl - 1 - methoxyvinyl) - 6,7,8,14-tetrahydro - 6,14 - endoethenonororipavine is treated with m-tolylhydrazine hydrochloride in acetic acid to give N - cyclopropylmethyl - 7α - [1 - (m - tolyl) - 5 - pyrazolyl] - 6,7,8,14 - tetrahydro - 6,14 - endoethenonororipavine, M.P. 190–192° C., after crystallization from acetone-hexane.

EXAMPLE 48

Preparation of N - cyclopropylmethyl - 7α - (1 - methyl-5-pyrazolyl) - 6,7,8,14-tetrahydro - 6,14 -endoethenonororipavine Following the general procedure of Example 4, N-cyclopropylmethyl - 7α - (2 - formyl - 1 - methoxyvinyl)-6,7,8,14-tetrahydro-6,14 - endoethenonororipavine is treated with methylhydrazine hydrochloride in acetic acid to give N - cyclopropylmethyl - 7α - (1 - methyl - 5 - pyrazolyl)-6,7,8,14-tetrahydro-6,14-endoethenonororipavine.

EXAMPLE 49

Preparation of N-allyl-7α-(1-phenyl-5-pyrazolyl)-6,7,8,14-tetrahydro-6,14-endoethenonororipavine Following the general procedure of Example 17, N-allyl-7α-(2 - formyl-1-methoxyvinyl)-6,7,8,14-tetrahydro-6,14 - endoethenonororipavine is treated with phenylhydrazine hydrochloride in acetic acid to give N-allyl-7α-(1-phenyl-5-pyrazolyl) - 6,7,8,14 - tetrahydro-6,14-endoethenonororipavine.

EXAMPLE 50

Preparation of N-allyl-7α-[1-(m-chlorophenyl)-5-pyrazolyl]-6,7,8,14-tetrahydro-6,14-endoethenonororipavine Following the general procedure of Example 17, N-allyl-7α-(2-formyl - 1 - methoxyvinyl) - 6,7,8,14 - tetrahydro-6,14-endoethenonororipavine is treated with m-chlorophenylhydrazine hydrochloride in acetic acid to give N-allyl - 7α-[1 - (m-chlorophenyl) - 5 - pyrazolyl]-6,7,8,14-tetrahydro-6,14-endoethenonororipavine.

EXAMPLE 51

Preparation of N-(3-methyl-2-buten-1-yl)-7α-(1-phenyl-5-pyrazolyl)-6,7,8,14-tetrahydro-6,14-endoethenonororipavine Following the general procedure of Example 17, N-(3-methyl - 2 - buten - 1 - yl)-7α-(2-formyl-1-methoxyvinyl)-6,7,8,14 - tetrahydro - 6,14 - endoethenonororipavine is treated with phenylhydrazine hydrochloride in acetic acid to give N-(3-methyl-2-buten-1-yl)-7α-(1-phenyl-5-pyrazolyl)-6,7,8,14-tetrahydro - 6,14 - endoethenonororipavine. This base is dissolved in ether, an ether solution of hydrogen chloride is added, and the precipitate is collected and dried in air; a dihydrochloride dihydrate, M.P. ca. 270° C. with decomposition is thereby obtained.

EXAMPLE 52

Preparation of N-(3-methyl-2-buten-1-yl)-7α-[1-(m-chlorophenyl) - 5 - pyrazolyl] - 6,7,8,14 - tetrahydro-6-14-endoethenonororipavine Following the general procedure of Example 17, N-(3-methyl - 2 - buten - 1 - yl)-7α-(2-formyl-1-methoxyvinyl)-6,7,8,14 - tetrahydro - 6,14 - endoethenonororipavine is treated with m-chlorophenylhydrazine hydrochloride in acetic acid to give N-(3-methyl-2-buten-1-yl)-7α-[1-(m-chlorophenyl)-5-pyrazolyl] - 6,7,8,14 - tetrahydro-6,14-endoethenonororipavine. This base is dissolved in ether, an ether solution of hydrogen chloride is added, and the precipitate is collected and dried in air; a dihydrochloride dihydrate, M.P. ca. 270° C. with decomposition is thereby obtained.

EXAMPLE 53

Preparation of N-cyclobutylmethyl-7α-(1-phenyl-5-pyrazolyl) - 6,7,8,14 - tetrahydro - 6,14 - endoethenonororipavine Following the general procedure of Example 17, N-cyclobutylmethyl-7α - (2-formyl - 1 - methoxyvinyl)-6,7,8,14-tetrahydro - 6,14 - endoethenonororipavine is treated with phenylhydrazine hydrochloride in acetic acid to give N-cyclobutylmethyl-7α-(1-phenyl - 5 - pyrazolyl)-6,7,8,14-tetrahydro-6,14-endoethenonororipavine.

EXAMPLE 54

Preparation of N-cyclobutylmethyl - 7α - [1 - (m-chlorophenyl) - 5 - pyrazolyl] - 6,7,8,14 - tetrahydro-6,14-endoethenonororipavine Following the general procedure of Example 4, N-cyclobutylmethyl-7α-(2 - formyl - 1 - methoxyvinyl)- 6,7,8,14 - tetrahydro - 6,14 - endoethenonororipavine is treated with m-chlorophenylhydrazine hydrochloride in acetic acid to give N-cyclobutylmethyl-7α-[1-(m-chlorophenyl) - 5 - pyrazolyl] - 6,7,8,14 - tetrahydro-6,14-endoethenonororipavine.

EXAMPLE 55

Preparation of N-cyclopropylmethyl-7α-[1-(o-fluorophenyl) - 5-pyrazolyl] - 6,7,8,14 - tetrahydro-6,14-endoethenonororipavine Following the general procedure of Example 17, N-cyclopropylmethyl - 7α - (2 - formyl - 1 - methoxyvinyl)- 6,7,8,14 - tetrahydro - 6,14 - endoethenonororipavine is treated with o-fluorophenylhydrazine hydrochloride in acetic acid to give N-cyclopropylmethyl-7α-[1-(o-fluorophenyl) - 5 - pyrazolyl] - 6,7,8,14 - tetrahydro-6,14-endoethenonororipavine, M.P. 219–221° C., after crystallization from acetone-hexane.

EXAMPLE 56

Preparation of N-cyclopropylmethyl-7α-[1-(3,5-dichlorophenyl) - 5 - pyrazolyl] - 6,7,8,14 - tetrahydro-6,14-endoethenonororipavine Following the general procedure of Example 17, N-cyclopropylmethyl-7α-(2 - formyl - 1 - methoxyvinyl)- 6,7,8,14 - tetrahydro - 6,14 - endoethenonororipavine is treated with 3,5-dichlorophenylhydrazine hydrochloride in acetic acid to give N-cyclopropylmethyl-7α-[1-(3,5-dichlorophenyl) - 5 - pyrazolyl] - 6,7,8,14 - tetrahydro-6,14-endoethenonororipavine. The hydrochloride salt has M.P. 276–278° C. dec. after crystallization from ethanol.

EXAMPLE 57

Preparation of N-cyclopropylmethyl-7α-[1-(m-nitrophenyl) - 5 - pyrazolyl] - 6,7,8,14 - tetrahydro-6,14-endoethenonororipavine Following the general procedure of Example 4, N-cyclopropylmethyl - 7α - (2 - formyl - 1 - methoxyvinyl) - 6,7,8,14-tetrahydro-6,14-endoethenonororipavine is treated with n-nitrophenylhydrazine hydrochloride in acetic acid to give N-cyclopropylmethyl - 7α - [1-(m-nitrophenyl) - 5 - pyrazolyl] - 6,7,8,14 - tetrahydro-6,14-endoethenonororipavine, M.P. 190–193° C., after crystallization from acetone-hexane.

EXAMPLE 58

Preparation of 7α-(1-phenyl-5-pyrazolyl)-6,7,8,14-tetrahydro-6,14-endoethenoripavine Following the general procedure of Example 17, 7α-(2-formyl - 1 - methoxyvinyl) - 6,7,8,14 - tetrahydro-6,14 - endoethenooripavine is treated with phenylhydrazine hydrochloride in acetic acid to give 7α-(1-phenyl - 5 - pyrazolyl) - 6,7,8,14 - tetrahydro-6,14-endoethenooripavine, M.P. 270–272° C. dec., after crystallization from methanol.

EXAMPLE 59

Preparation of N-cyclopropylmethyl - 7α-[1-(m-chlorophenyl) - 5 - pyrazolyl] - 6,7,8,14 - tetrahydro-6,14-endoethenonorthebaine Following the general procedure of Example 17, N-cyclopropylmethyl-7α-(2 - formyl - 1 - methoxyvinyl)- 6,7,8,14 - tetrahydro - 6,14 - endoethenonorthebaine is treated with m-chlorophenylhydrazine hydrochloride in acetic acid to give N-cyclopropylmethyl-7α-[1-(m-chlorophenyl) - 5 - pyrazolyl] - 6,7,8,14 - tetrahydro-6,14-endoethenonorthebain. The hydrochloride salt has M.P. 273–274° C. dec., after crystallization from ethanol.

EXAMPLE 60

Preparation of N-cyclopropylmethyl-7α-(1-phenyl-5-pyrazolyl)-6,7,8,14-tetrahydro - 6,14 - endoethenonororipavine Diethyleneglycol (5 ml.) containing potassium hydroxide (1 g.) is brought to 215° C. and N-cyclopropylmethyl-7α-(1-phenyl - 5 - pyrazolyl) - 6,7,8,14 - tetrahydro - 6,14 - endoethenonorthebaine (100 mg.) is added with stirring, maintaining the temperature for 1 hour. After cooling, saturated aqueous ammonium chloride solution (50 ml.) is added and the resulting precipitate filtered. The remaining solution is extracted six times with methylene chloride (20 ml. portions), the organic extracts are combined, extracted with water, dried over sodium sulfate and evaporated to give a brown oil. The oil and crude filtered precipitate are combined, dissolved in methylene chloride and filtered through a short plug of Magnesol® to give a pale yellow solution which upon slow evaporation gives crude crystalline N-cyclopropylmethyl-7α-(1-phenyl - 5 - pyrazolyl) - 6,7,8,14 - tetrahydro-6,14-endoethenonororipavine, M.P. 178–182° C., identical with authentic material.

EXAMPLE 61

Preparation of 7α-(1-phenyl-5-pyrazolyl)-6,7,8,14-tetrahydro-6,14-endoethanothebaine 7α-(2-formyl-1-methoxyvinyl)-6,7,8,14-tetrahydro-6,14-endoethanothebaine, phenylhydrazine hydrochloride and acetic acid are heated on the steam bath for 30 minutes. The mixture is diluted with water and then neutralized with aqueous sodium bicarbonate. The material which separates is collected, dried via methylene chloride solution followed by evaporation, and crystallized to give 7α-(1-phenyl-5-pyrazolyl)-6,7,8,14-tetrahydro-6,14 - endoethanothebaine.

EXAMPLE 62

Preparation of 7α-(1-phenyl-5-pyrazolyl)-6,7,8,14-tetrahydro-6,14-endoethanooripavine The general procedure of Example 60 is repeated whereby 7α-(1-phenyl-5-pyrazolyl)-6,7,8,14-tetrahydro - 6,14-endoethanothebaine is added, with stirring, to a mixture of potassium hydroxide and diethyleneglycol maintained at 215° C. After the hydrolysis is complete, the mixture is cooled, treated with an excess of saturated ammonium chloride solution and the product is isolated. 7α-(1-phenyl-5-pyrazolyl)-6,7,8,14-tetrahydro - 6,14 - endoethanooripavine is thereby obtained.

EXAMPLE 63

Preparation of N-cyclopropylmethyl-7α-(1-phenyl-5-pyrazolyl)-6,7,8,14-tetrahydro-6,14-endoethanonororipavine Following the general procedure of Example 4, N-cyclopropylmethyl-7α-(2-formyl-1 - methoxyvinyl) - 6,7,8,14-tetrahydro-6,14-endoethanonororipavine is treated with phenyl hydrazine hydrochloride in acetic acid to give N-cyclopropylmethyl-7α-(1-phenyl-5 - pyrazolyl) - 6,7,8,14-tetrahydro-6,14-endoethanonororipavine.

EXAMPLE 64

Preparation of N-cyclopropylmethyl-7α-[1-(m - chlorophenyl)-5-pyrazolyl]-6,7,8,14-tetrahydro - 6,14 - endoethanonororipavine Following the general procedure of Example 4, N-cyclopropylmethyl-7α-(2-formyl-1 - methoxyvinyl) - 6,7,8,14-tetrahydro-6,14-endoethanonororipavine is treated with m-chlorophenyl hydrazine hydrochloride in acetic acid to give N-cyclopropylmethyl-7α-[1-(m - chlorophenyl) - 5-pyrazolyl]-6,7,8,14-tetrahydro - 6,14 - endoethanonororipavine.

EXAMPLE 65

Preparation of N-cyclopropylmethyl-7β-(1 - phenyl - 5-pyrazolyl)-6,7,8,14-tetrahydro-6,14 - endoethenonororipavine Following the general procedure of Example 4, N-cyclopropylmethyl-7β-(2-formyl-1 - methoxyvinyl) - 6,7,8,14-tetrahydro-6,14-endoethenonororipavine is treated with phenyl hydrazine hydrochloride in acetic acid to give N-cyclopropylmethyl-7β-(1-phenyl-5 - pyrazolyl) - 6,7,8,14-tetrahydro-6,14-endoethenonororipavine.

EXAMPLE 66

Preparation of N-cyclopropylmethyl-7β-[1-(m - chlorophenyl)-5-pyrazolyl]-6,7,8,14-tetrahydro - 6,14 - endoethenonororipavine Following the general procedure of Example 4, N-cyclopropylmethyl-7β-(2-formyl-1 - methoxyvinyl) - 6,7,8,14-tetrahydro-6,14-endoethenonororipavine is treated with m-chlorophenyl hydrazine hydrochloride in acetic acid to give N-cyclopropylmethyl-7β-[1-(m - chlorophenyl) - 5-pyrazolyl]-6,7,8,14-tetrahydro - 6,14 - endoethenonororipavine.

EXAMPLE 67

Preparation of 7α-(2-formyl-1-methoxyvinyl) - 6,7,8,14-tetrahydro-6,14-endoethenothebaine A solution of phosgene (20 g.) in methylene chloride (200 ml.) is added rapidly dropwise with stirring to a mixture of dimethyl formamide (200° ml.; dried over molecular sieves) and methylene chloride (600 ml.). The mixture is stirred for a further 15 minutes after the addition is complete. A solution of 7α-(1,1-dimethoxyethyl)-6,7,8,14-tetrahydro-6,14-endoethenothebaine (19.4 g.) in methylene chloride (200 ml.) and pyridine (10 ml.) is then added in a slow stream and the mixture is stirred for 45 minutes. Aqueous sodium acetate (1200 ml.; 5% is then added and the mixture is stirred vigorously for 30 minutes. If necessary, the mixture is adjusted to pH 8 by the addition of aqueous sodium bicarbonate and the layers are separated. The aqueous layer is washed with methylene chloride and is then made strongly alkaline with sodium hydroxide solution (10%). The mixture is extracted with ether and the extract is washed with water and dried. Evaporation of solvent followed by crystallization of the residue from acetone-n-hexane gives 7α-(2-formyl-1 - methoxyvinyl)-6,7,8,14 - tetrahydro - 6,14 - endoethenothebaine (15.37 g.), M.P. 152–153° C. A further amount (1.42 g.), M.P. 150–152° C., is obtained from the mother liquor to give a total yield of 87%.

EXAMPLE 68

Preparation of N-cyclopropylmethyl-7α-(2 - formyl - 1-methoxyvinyl)-6,7,8,14-tetrahydro-6,14 - endoethenonorthebaine hydrochloride A solution of phosgene (1 g.) in methylene chloride (10 ml.) is added rapidly dropwise with stirring to a mixture of dimethylformamide (10 ml.; dried over molecular sieves) and methylene chloride (30 ml.). The mixture is stirred for a further 15 minutes after the addition is complete. A solution of N-cyclopropylmethyl-7α-(1,1-dimethoxyethyl)-6,7,8,14-tetrahydro - 6,14 - endoethenonorthebaine (1 g.) in methylene chloride (10 ml.) and pyridine (0.5 ml.) is then added in a slow stream, and the mixture is stirred at room temperature for 45 minutes. Aqueous sodium hydroxide (60 ml.; 5%) is then added, and the mixture is stirred vigorouly for 30 minutes. The layers are separated and the organic phase is washed with water and dried. The oil obtained by evaporation of solvent is dissolved in dilute hydrochloric acid (5%), and the solution is washed with ether and extracted with methylene chloride. The extract is dried and evaporated. Acetone is added to cause crystallization and the material is collected with the aid of ether to give N-cyclopropylmethyl-7α-(2-formyl-1-methoxyvinyl) - 6,7,8,14 - tetrahydro - 6,14 - endoethenonorthebaine hydrochloride (835 mg.), M.P. 213–215° C.

EXAMPLE 69

Preparation of 7α-(2-formyl-1-methoxyvinyl)-6,7,8,14-tetrahydro-6,14-endoethenooripavine Following the general procedure of Example 68, 7α-(1,1 - dimethoxyethyl) - 6,7,8,14-tetrahydro - 6,14 - endoethenooripavine is treated with phosgene-dimethylformamide followed by hydrolysis to give 7α-(2-formyl-1-methoxyvinyl)-6,7,8,14-tetrahydro-6,14-endoethenooripavine.

EXAMPLE 70

Preparation of N - cyclopropylmethyl - 7α - (2-formyl-1-methoxyvinyl) - 6,7,8,14 - tetrahydro-6,14-endoethenonororipavine Following the general procedure of Example 68, N-cyclopropylmethyl - 7α-(1,1-dimethoxyethyl)-6,7,8,14-tetrahydro - 6,14 - endoethenonororipavine is treated with phosgene-dimethyl-formamide followed by hydrolysis to give N-cyclopropylmethyl - 7α - (2 - formyl-1-methoxyvinyl) - 6,7,8,14 - tetrahydro - 6,14 - endoethenonororipavine.

EXAMPLE 71

Preparation of N-cyclopropylmethyl - 7α - (2 - formyl-1-methoxyvinyl) - 6,7,8,14-tetrahydro-6,14-endoethanonororipavine Following the general procedure of Example 68, N-cyclopropylmethyl - 7α - (1,1-dimethoxyethyl) - 6,7,8,14-tetrahydro - 6,14 - endoethanonororipavine is treated with phosgene-dimethyl-formamide followed by hydrolysis to give N-cyclopropylmethyl - 7α - (2 - formyl-1-methoxyvinyl) - 6,7,8,14 - tetrahydro - 6,14 - endoethanonororipavine.

EXAMPLE 72

Preparation of N-cyclopropylmethyl - 7β - (2-formyl-1-methoxyvinyl) - 6,7,8,14 - tetrahydro-6,14-endoethenonororipavine Following the general procedure of Example 68, N-cyclopropylmethyl - 7β - (1,1 - dimethoxyethyl)-6,7,8,-14-tetrahydro - 6,14 - endoethenonororipavine is treated with phosgene-dimethyl-formamide followed by hydrolysis to give N-cyclopropylmethyl - 7β - (2 - formyl-1-methoxyvinyl) - 6,7,8,14 - tetrahydro - 6,14 - endoethenonororipavine.

EXAMPLE 73

Preparation of N-cyano-7α-(2-formyl-1-methoxyvinyl)-6,7,8,14-tetrahydro-6,14-endoethenonorthebaine Following the general procedure of Example 67, 7α-ano - 7α - (1,1-dimethoxyethyl) - 6,7,8,14 - tetrahydro-6,14 - endoethenonorthebaine is treated with phosgene-dimethylformamide followed by hydrolysis to give N-cyano - 7α - (2 - formyl - 1 - methoxyvinyl) - 6,7,8,14-tetrahydro - 6,14 - endoethenonorthebaine.

EXAMPLE 74

Preparation of 7α-(2-formyl-1-methoxyvinyl)-6,7,8,14-tetrahydro-6,14-endoethenonorthebaine Following the general procedure of Example 68, 7α-(1,1 - dimethoxyethyl) - 6,7,8,14 - tetrahydro - 6,14-endoethenonorthebaine is treated with phosgene-dimethylformamide followed by hydrolysis to give 7α - (2 - formyl-1-methoxyvinyl) - 6,7,8,14 - tetrahydro - 6,14 - endoethenonorthebaine.

EXAMPLE 75

Preparation of 7α-(2-formyl-1-methoxy-1-butenyl)-6,7,8,14-tetrahydro-6,14-endoethenothebaine Following the general procedure of Example 67, 7α-(1,1 - dimethoxybutyl) - 6,7,8,14 - tetrahydro - 6,14- endoethenothebaine is treated with phosgene-dimethylformamide followed by hydrolysis to give 7α - (2 - formyl-1-methoxy - 1 - butenyl) - 6,7,8,14 - tetrahydro-6,14-endoethenothebaine.

EXAMPLE 76

Preparation of 7α-(2-formyl-1-methoxyvinyl)-6,7,8,14-tetrahydro-6,14-endoethanothebaine Following the general procedure of Example 67, 7α-(1,1-dimethoxyethyl)-6,7,8,14-tetrahydro-6,14-endoethanothebaine is treated with phosgene-dimethylformamide followed by hydrolysis to give 7α-(2-formyl-1-methoxyvinyl)-6,7,8,14-tetrahydro-6,14-endoethanothebaine.

EXAMPLE 77

Preparation of 7β-(2-formyl-1-methoxyvinyl)-6,7,8,14-tetrahydro-6,14-endoethenothebaine Following the general procedure of Example 67, 7β-(1,1 - dimethoxyethyl) - 6,7,8,14 - tetrahydro - 6,14-endoethenothebaine is treated with phosgene-dimethylformamide followed by hydrolysis to give 7β-(2-formyl-1 - methoxyvinyl) - 6,7,8,14 - tetrahydro - 6,14 - endoethenothebaine.

EXAMPLE 78

Preparation of N-allyl-7α-(2-formyl-1-methoxyvinyl)-6,7,8,14-tetrahydro-6,14-endoethenonororipavine Following the general procedure of Example 67, N-allyl -7α - 1,1 - dimethoxyethyl) - 6,7,8,14 - tetrahydro-6,14 - endoethenonororipavine is treated with phosgene-dimethylformamide followed by hydrolysis to give N-allyl - 7α - (2 - formyl - 1 - methoxyvinyl) - 6,7,8,14-tetrahydro - 6,14 - endoethenonororipavine.

EXAMPLE 79

Preparation of 7α-(2 - formyl - 1 - methoxyvinyl)-N-(3-methyl - 2 - buten - 1 - yl)-6,7,8,14-tetrahydro-6,14-endoethenonororipavine Following the general procedure of Example 67, 7α-(1,1-dimethoxyethyl)-N-(3-methyl-2-buten-1-yl) - 6,7,8,14-tetrahydro-6,14-endoethenonororipavine is treated with phosgene-dimethylformamide followed by hydrolysis to give 7α-(2-formyl-1-methoxyvinyl)-N-(3-methyl-2-buten-1-yl)-6,7,8,14-tetrahydro-6,14-endoethenonororipavine.

EXAMPLE 80

Preparation of 7α - (2 - formyl - 1 - methoxy-4-methyl-1-penten - 1 - yl) - 6,7,8,14 - tetrahydro - 6,14 - endoethenothebaine Following the general procedure of Example 67, 7α-(1,1 - dimethoxy - 4 - methylpentyl) - 6,7,8,14 - tetrahydro - 6,14 - endoethenothebaine is treated with phosgene-dimethylformamide followed by hydrolysis to give 7α - 2 - formyl - 1 - methoxy - 4 - methyl-1-penten-1-yl)-6,7,8,14 - tetrahydro - 6,14 - endoethenothebaine.

EXAMPLE 81

Preparation of N-cyclobutylmethyl - 7α - (2 - formyl-1-methoxyvinyl) - 6,7,8,14 - tetrahydro - 6,14 - endoethenonororipavine Following the general procedure of Example 68, N-cyclobutylmethyl - 7α - (1,1 - dimethoxyethyl) - 6,7,8,14-tetrahydro - 6,14 - endoethenonororipavine is treated with phosgene-dimethylformamide followed by hydrolysis to give N-cyclobutylmethyl - 7α - (2 - formyl - 1 - methoxyvinyl) - 6,7,8,14 - tetrahydro - 6,14 - endoethenonororipavine.

EXAMPLE 82

Preparation of 7α-(1,1-dimethoxyethyl)-6,7,8,14-tetrahydro-6,14-endoethenothebaine Perchloric acid (20 ml.; 72%) is added dropwise to a stirred solution of 7α-acetyl-6,7,8,14-tetrahydro-6,14-endoethenothebaine (40 g.) in methanol (400 ml.). Trimethyl orthoformate (200 ml.) is then added, and the mixture is stirred for 5 minutes. Pyridine (40 ml.) is then added, and the mixture is poured into aqueous sodium bicarbonate. The material which separates is collected and dissolved in methylene chloride solution, and this fraction is dried. Evaporation of solvent followed by crystallization from methanol gives 7α - (1,1 - dimethoxyethyl)-6,7,8,14 - tetrahydro - 6,14 - endoethenothebaine (36.57 g.), M.P. 121–123° C. with effervescence. Second and third crops yield 2.1 g., M.P. 117–118° C. with effervescene and 0.6 g., M.P. 115–117° C with effervescence.

EXAMPLE 83

Preparation of 7α-(1,1-dimethoxyethyl)-6,7,8,14-tetrahydro-6,14-endoethenooripavine 7α-(1,1-dimethoxyethyl) - 6,7,8,14 - tetrahydro-6,14-endoethenothebaine (5 g.) is added to a solution of potassium hydroxide (20 g.) in diethylene glycol (100 ml.) heated to ca. 210° C. The reaction mixture is stirred at ca. 210° C. for 25 minutes, and is then cooled and diluted with water. The aqueous solution is washed with ether, adjusted to pH 8 with ammonium chloride, and then extracted with methylene chloride. The methylene chloride extracts are combined, washed with water and dried. The oil obtained by evaporation of the solvent is crystallized from methanol (charcoal) to give 7α-(1,1-dimethoxyethyl) - 6,7,8,14 - tetrahydro - 6,14 - endoethenooripavine (2.47 g.), M.P. 116–117° C. with effervescence. This material is solvated; when heated above its melting point, it resolidifies at about 135° C. and remelts at 178–180° C. A second crop (250 mg.) is also collected; M.P. 113–114° C. with effervescence, resolidified ca. 145° C., and remelts 174–176° C.

EXAMPLE 84

Preparation of N-cyano-7α-(1,1-dimethoxyethyl)-6,7,8,14-tetrahydro-6,14-endoethenonorthebaine A solution of cyanogen bromide (17.9 g.) in chloroform (175 ml.) is dried over sodium sulfate for a few minutes and is then filtered onto 7α-(1,1-dimethoxyethyl)-6,7,8,14-tetrahydro - 6,14 - endoethenothebaine (35 g.), chloroform (175 ml.) being used for washing. The mixture is heated under reflux for 26 hours. The cooled mixture is washed with an aqueous sodium bicarbonate solution, washed with water, and dried. The residue obtained by evaporation of the solvent is crystallized from methylene chloride-methanol to give N-cyano-7α-(1,1-dimethoxyethyl)-6,7,8,14-tetrahydro - 6,14-endoethenonorthebaine (20 g.), M.P 211–214° C. with effervescence.

EXAMPLE 85

Preparation of 7α-(1,1-dimethoxyethyl)-6,7,8,14-tetrahydro-6,14-endoethenonorthebaine N-cyano - 7α - (1,1-dimethoxyethyl) - 6,7,8,14 - tetrahydro - 6,14 - endoethenonorthebaine (0.5 g.) is added to a solution of potassium hydroxide (2 g.) in ethylene glycol (10 ml.) heated to ca. 167° C. The reaction mixture is stirred at ca. 167° C. for 15 minutes, and is then cooled and diluted with water. The aqueous solution is extracted with diethyl ether, and the ether extracts are combined, washed with water and dried. The residue obtained by evaporation of the solvent is crystallized from diethyl ether to give 7α-(1,1-dimethoxyethyl)-6,7,8,14-tetrahydro-6,14-endoethenonorthebaine (213 mg.), M.P. 139–145° C.

EXAMPLE 86

Preparation of 7α-(1,1-dimethoxyethyl)-6,7,8,14-tetrahydro-6,14-endoethenonororipavine One hundred ml. of diethylene glycol containing 20.0 g. potassium hydroxide is heated to 215° C. and 5.00 g. of 7α-(1,1-dimethoxyethyl) - 6,7,8,14 - tetrahydro - 6,14-endoethenonorthebaine is added. The temperature is maintained between 215° C. and 220° C. for 30 minutes and then allowed to cool to room temperature over about one hour. The solution is diluted with 200 ml. of water, and 100 ml. of saturated aqueous ammonium chloride is added. The solution is extracted with six 50 ml. portions of methylene chloride which are combined, extracted one time with water, dried over anhydrous sodium sulfate and evaporated to give an oil which crystallizes upon trituration with methanol; 7α-(1,1-dimethoxyethyl) - 6,7,8,14-tetrahydro - 6,14 - endoethenonororipavine, M.P. 260° C. decomp. is obtained.

EXAMPLE 87

Preparation of 7α-(1,1-dimethoxybutyl)-6,7,8,14-tetrahydro-6,14-endoethenothebaine Following the general procedure of Example 82, 7α-butyryl - 6,7,8,14 - tetrahydro - 6,14 - endoethenothebaine is treated with perchloric acid and trimethyl orthoformate in methanol at room temperature to give 7α-(1,1-dimethoxybutyl) - 6,7,8,14 - tetrahydro - 6,14 - endothenothebaine.

EXAMPLE 88

Preparation of 7α-(1,1-dimethoxyethyl)-6,7,8,14-tetrahydro-6,14-endoethanothebaine Following the general procedure of Example 82, 7α-acetyl - 6,7,8,14 - tetrahydro - 6,14 - endoethanothebaine is treated with perchloric acid and trimethyl orthoformate in methanol at room temperature to give 7α-(1,1-dimethoxyethyl) - 6,7,8,14 - tetrahydro - 6,14 - endothanothebaine.

EXAMPLE 89

Preparation of 7β-(1,1-dimethoxyethyl)-6,7,8,14-tetrahydro-6,14-endoethenothebaine Following the general procedure of Example 82, 7β-acetyl - 6,7,8,14 - tetrahydro - 6,14 - endoethenothebaine is treated with perchloric acid and trimethyl orthoformate in methanol at room temperature to give 7β-(1,1-dimethoxyethyl) - 6,7,8,14 - tetrahydro - 6,14 - endoethanothebaine.

EXAMPLE 90

Preparation of N-cyclopropylcarbonyl-7α-(1,1-dimethoxyethyl)-6,7,8,14-tetrahydro-6,14-endoethenonorthebaine 7α-(1,1-dimethoxyethyl) - 6,7,8,14 - tetrahydro - 6,14-endoethenonorthebaine (50 mg.) in pyridine (2 ml.) is added dropwise to a stirred mixture of cyclopropylcarbonyl chloride (50 mg.) and pyridine (2 ml.) at 0° C., and the resulting mixture is stirred at 0° C. for ca. 2 hours. This is then added dropwise to an aqueous sodium bicarbonate solution with stirring. The precipitate is collected and dried in methylene chloride. The residue obtained upon evaporation of solvent is collected with diethyl ether to give N-cyclopropylcarbonyl - 7α - (1,1-dimethoxyethyl) - 6,7,8,14 - tetrahydro - 6,14 - endoethenonorthebaine (30 mg.), M.P. 164–169° C. with effervescence.

EXAMPLE 91

Preparation of N-cyclopropylmethyl-7α-(1,1-dimethoxyethyl)-6,7,8,14-tetrahydro-6,14-endoethenonorthebaine Finely powdered N - cyclopropylcarbonyl-7α-(1,1-dimethoxyethyl) - 6,7,8,14 - tetrahydro - 6,14 - endoethenonorthebaine (51.5 g.) is added to a stirred suspension of lithium aluminum hydride (26 g.) in diethyl ether (2 liters) and the mixture is heated under reflux for 2 hours. Water is added dropwise cautiously until the excess of lithium aluminum hydride decomposes and then the ether is decanted and dried. The residue obtained by evaporation of solvent is crystallized from methanol-n-hexane to give N-cyclopropylmethyl - 7α - (1,1-dimethoxyethyl)-6,7,8,14-tetrahydro - 6,14 - endoethenonorthebaine (41.86 g., 83.5%), M.P. 130–132° C.

EXAMPLE 92

Preparation of N-cyclopropylmethyl-7α-(1,1-dimethoxyethyl)-6,7,8,14-tetrahydro-6,14-endoethenonororipavine Following the general procedure of Example 83, N-cyclopropylmethyl - 7α - (1,1-dimethoxyethyl) - 6,7,8,14-tetrahydro-6,14-endoethenonorthebaine (2 g., 43 mmole) is added to a stirred solution of potassium hydroxide (8 g.) in diethylene glycol (40 ml.) at ca. 220° C. After 30 minutes at this temperature the mixture is cooled and diluted with water. The solution is adjusted to pH 8 with saturated aqueous ammonium chloride added dropwise with vigorous stirring. The precipitate which forms is filtered off and dried via methylene chloride solution. The oil obtained by evaporation of the solvent is treated with charcoal in diethyl ether solution. Evaporation of solvent gives an oil which crystallizes from methanol to give N-cyclopropylmethyl - 7α - (1,1-dimethoxyethyl) - 6,7,8,14-tetrahydro - 6,14 - endoethenonororipavine methanolate, M.P. 97–99° C. with effervescence.

EXAMPLE 93

Preparation of N-(3-methyl-2-buten-1-yl)-7α-(1,1-dimethoxyethyl) - 6,7,8,14 - tetrahydro - 6,14 - endoethenonororipavine 1-bromo-3-methyl-2-butene (dimethallyl bromide; 1.00 g.) is added to a stirred suspension of the norketal 7α-(1,1-dimethoxyethyl) - 6,7,8,14-tetrahydro-6,14-endoethenonororipavine (2.400 g.) in 30 ml. of methylene chloride and stirring is continued at room temperature for 40 hours during which time all the material dissolves. The organic solvent is shaken with excess aqueous sodium bicarbonate solution, dried over sodium sulfate and evaporated. Trituration of the resulting brown oil with methanol results in the crystallization of N-(3-methyl-2-buten-1-yl)-7α-(1,1-dimethoxyethyl) - 6,7,8,14 - tetrahydro - 6,14-endoethenonororipavine (0.963 g., 47%) in two crops both having M.P. 170–172° C.

EXAMPLE 94

Preparation of N-cyclobutylcarbonyl-7α-(1,1-dimethoxyethyl)-6,7,8,14-tetrahydro-6,14-endoethenonorthebaine Cyclobutylcarbonyl chloride (10 g.) is added to methylene chloride (200 ml.) containing anhydrous potassium carbonate (10 g.) and stirred at room temperature for 15 minutes. The ketal 7α-(1,1-dimethoxyethyl)-6,7,8,14-tetrahydro-6,14-endoethenonorthebaine (20 g.) in methylene chloride (200 ml.) is added in a rapid stream, and the mixture stirred for one hour. After washing with excess aqueous sodium bicarbonate solution and then with water the organic solution is dried over sodium sulfate and evaporated to give an oil (a band in the infrared at about 6.7μ indicates the presence of ketone from hydrolyzed ketal). The oil is then dissolved in methanol (200 ml.), 72% perchloric acid (10 ml.) is added followed by trimethylorthoformate (100 ml.). After stirring at room temperature for five minutes, pyridine (20 ml.) is added and the entire mixture poured into aqueous sodium bicarbonate solution (300 ml.). The mixture is extracted six times with 50 ml. portions of methylene chloride; the organic phases are combined, extracted with water, dried over sodium sulfate and evaporated. Crystalline N-cyclobutylcarbonyl-7α-(1,1-dimethoxyethyl) - 6,7,8,14 - tetrahydro-6,14-endoethenonorthebaine is obtained in 5 successive crops by crystallization from methanol/hexane (total yield 17.15 g.; 71.5%), M.P. 184–185° C.

EXAMPLE 95

Preparation of N-cyclobutylmethyl - 7α-(1,1-dimethoxyethyl)-6,7,8,14-tetrahydro-6,14-endoethenonorthebaine N - cyclobutylcarbonyl - 7α - (1,1-dimethoxyethyl)-6,7,8,14-tetrahydro-6,14-endoethenonorthebaine (16.4 g.) is mixed with 200 ml. of diethyl ether and added to a stirred suspension of lithium aluminum hydride (7 g.) in 400 ml. of diethyl ether, and the mixture is heated under reflux for 2.5 hours. Water is cautiously added dropwise until the excess lithium aluminum hydried is decomposed. The ether layer is decanted, dried, and evaporated to a non-crystalline residue. N-cyclobutylmethyl-7α-(1,1-dimethoxyethyl) - 6,7,8,14 - tetrahydro - 6,14 - endoethenonorthebaine is thereby obtained as a glass; infrared, no carbonyl band; nuclear magnetic resonance δ 3.22 ($C_{19}$-dimethoxy) and 2.50 (N—$CH_2$—$C_4H_7$).

EXAMPLE 96

Preparation of N-cyclobutylmethyl-7α-(1,1-dimethyloxyethyl)-6,7,8,14-tetrahydro-6,14-endoethenonororipavine Following the general procedure of Example 83, N-cyclobutylmethyl - 7α - (1,1-dimethoxyethyl) - 6,7,8,14-tetrahydro-6,14-endoethenonorthebaine is treated with potassium hydroxide in diethyleneglycol at ca. 210°–220° C. to give N-cyclobutylmethyl-7α-(1,1-dimethoxyethyl) - 6,7,8, 14-tetrahydro-6,14-endoethenonororipavine.

EXAMPLE 97

Preparation of N-allyl-7α-(1,1-dimethoxyethyl)-6,7,8,14-tetrahydro-6,14-endoethenonororipavine By reacting 7α-(1,1 - dimethoxyethyl)-6,7,8,14-tetrahydro-6,14-endoethenonororipavine with allyl bromide in an inert solvent, N-allyl-7α-(1,1-dimethoxyethyl) - 6,7,8,14-tetrahydro - 6,14 - endoethenonororipavine is thereby obtained.

EXAMPLE 98

Preparation of N-cyclopropylcarbonyl-7α-(1,1-dimethoxyethyl)-6,7,8,14-tetrahydro-6,14-endoethanonorthebaine 7α-(1,1-dimethoxyethyl)-6,7,8,14-tetrahydro - 6,14 - endoethanonorthebaine in pyridine is added dropwise to a stirred mixture of cyclopropylcarbonyl chloride and pyridine at 0° C., and the resulting mixture is stirred at 0° C. for ca. 2 hours. This is then added dropwise to an aqueous sodium bicarbonate solution with stirring. The precipitate is collected and dried in methylene chloride. The residue obtained upon evaporation of solvent is collected with diethyl ether to give N-cyclopropylcarbonyl-7α-(1,1-dimethoxyethyl) - 6,7,8,14 - tetrahydro - 6,14 - endoethanonorthebaine.

EXAMPLE 99

Preparation of N-cyclopropylmethyl-7α-(1,1-dimethoxyethyl)-6,7,8,14-tetrahydro-6,14-endoethanonorthebaine Lithium aluminum hydride is added to a solution of N-cyclopropylcarbonyl - 7α-(1,1-dimethoxyethyl) - 6,7,8, 14-tetrahydro-6,14-endoethanonorthebaine in anhydrous tetrahydrofuran, and the mixture is heated under reflux for ca. 1 hour. A saturated aqueous solution of potassium sodium tartrate is added. The mixture is filtered, and the residue is washed several times with diethyl ether. The combined washings and filtrate are washed with water and dried. Evaporation of the solvent gives N-cyclopropylmethyl-7α-(1,1-dimethoxyethyl) - 6,7,8,14 - tetrahydro - 6,14-endoethanonorthebaine.

EXAMPLE 100

Preparation of N-cyclopropylmethyl-7α-(1,1-dimethoxyethyl)-6,7,8,14-tetrahydro-6,14-endoethanonororipavine Following the general procedure of Example 83, N-cyclopropylmethyl-7α-(1,1 - dimethoxyethyl) - 6,7,8,14-tetrahydro-6,14-endoethanonorthebaine is treated with potassium hydroxide in diethyleneglycol at ca. 210–220° C. to give N-cyclopropylmethyl - 7α-(1,1-dimethoxyethyl)-6,7,8,14-tetrahydro-6,14-endoethanonororipavine.

EXAMPLE 101

Preparation of 7α-(1,1-dimethoxyethyl)-6,7,8,14-tetrahydro-6,14-endoethanonorthebaine N-cyano-7α-(1,1 - dimethoxyethyl) - 6,7,8,14-tetrahydro-6,14-endoethanonorthebaine is added to a solution of potassium hydroxide in ethylene glycol heated to ca. 165° C. The reaction mixture is stirred at ca. 165° C. for 15 minutes, and is then cooled and diluted with water. The aqueous solution is extracted with diethyl ether, and the ether extracts are combined, washed with water and dried. The residue obtained by evaporation of the solvent is crystallized to give 7α-(1,1-dimethoxyethyl)-6,7,8,14-tetrahydro-6,14-endoethanonorthebaine.

EXAMPLE 102

Preparation of N-cyano-7α-(1,1-dimethoxyethyl)-6,7,8,14-tetrahydro-6,14-endoethanonorthebaine A solution of cyanogen bromide in chloroform is dried over sodium sulfate for a few minutes, and is then filtered onto 7α-(1,1-dimethoxyethyl)-6,7,8,14-tetrahydro-6,14-endoethanothebaine, chloroform being used for washing. The mixture is heated under reflux for about 24 hours. The cooled mixture is washed with an aqueous sodium bicarbonate solution, washed with water and dried. The residue obtained by evaporation of the solvent is crystallized to give N-cyano-7α-(1,1-dimethoxyethyl)-6,7,8,14-tetrahydro-6,14-endoethanonorthebaine.

EXAMPLE 103

Preparation of N-cyano-7β-(1,1-dimethoxyethyl)-6,7,8,14-tetrahydro-6,14-endoethenonorthebaine A solution of cyanogen bromide in chloroform is filtered onto 7β-(1,1-dimethoxyethyl)-6,7,8,14-tetrahydro-6,14-endoethanothebaine, chloroform being used for washing. The mixture is heated under reflux for 26 hours. The cooled mixture is washed with an aqueous sodium bicarbonate solution, washed with water, and dried. The residue obtained by evaporation of the solvent is N-cyano-7β-(1,1 - dimethoxyethyl) - 6,7,8,14-tetrahydro - 6,14-endoethenonorthebaine.

EXAMPLE 104

Preparation of 7β-(1,1-dimethoxyethyl)-6,7,8,14-tetrahydro-6,14-endoethenonorthebaine N-(cyano - 7β - (1,1-dimethoxyethyl)-6,7,8,14-tetrahydro-6,14-endoethenonorthebaine is added to a solution of potassium hydroxide in ethylene glycol heated to ca. 165° C. The reaction mixture is stirred at ca. 165° C. for 15 minutes, and is then cooled and diluted with water. The aqueous solution is extracted with diethyl ether, and the ether extracts are combined, washed with water and dried. The residue obtained by evaporation of the solvent is 7β-(1,1 - dimethoxyethyl) - 6,7,8,14-tetrahydro-6,14-endoethenonorthebaine.

EXAMPLE 105

Preparation of N-cyclopropylmethyl-7β-(1,1-dimethoxyethyl)-6,7,8,14-tetrahydro-6,14-endoethenonorthebaine 7β-(1,1 - dimethoxyethyl) - 6,7,8,14 - tetrahydro-6,14-endoethenonorthebaine in pyridine is added dropwise to a stirred mixture of cyclopropylcarbonyl chloride and pyridine at 0° C., and the resulting mixture is stirred at 0° C. This is then added dropwise to an aqueous sodium bicarbonate solution with stirring. The precipitate is collected and dried in methylene chloride. The residue obtained upon evaporation of solvent is collected to give N-cyclopropylcarbonyl - 7β - (1,1-dimethoxyethyl)-6,7,8, 14-tetrahydro-6,14-endoethenonorthebaine. Lithium aluminum hydride is added to a solution of N-cyclopropylcarbonyl-7β - (1,1 - dimethoxyethyl)-6,7,8,14-tetrahydro-6,14-endoethenonorthebaine in anhydrous tetrahydrofuran, and the mixture is heated under reflux. A saturated aqueous solution of potassium sodium tartrate is added. The mixture is filtered, and the residue is washed several times with diethyl ether. The combined washings and filtrate are washed with water and dried. Evaporation of the solvent gives N-cyclopropylmethyl-7β-(1,1-dimethoxyethyl) - 6,7,8,14 - tetrahydro-6,14-endoethenonorthebaine.

EXAMPLE 106

Preparation of N - cyclopropylmethyl-7β-(1,1-dimethoxyethyl)-6,7,8-14-tetrahydro-6,14-endoethenonororipavine Following the general procedure of Example 83, N-cyclopropylmethyl - 7β - (1,1-dimethoxyethyl)-6,7,8,14-tetrahydro-6,14-endoethenonorthebaine is treated with potassium hydroxide in diethyleneglycol at ca. 210°–220° C. to give N-cyclopropylmethyl-7β-(1,1-dimethoxyethyl)-6,7,8,14-tetrahydro-6,14-endoethenonororipavine.

What is claimed is:

1. A compound selected from the group consisting of N - cyclopropylmethyl - 7α - (1-phenyl-5-pyrazolyl)-6,7,8,14-tetrahydro-6,14-endoethenonororipavine and the non-toxic acid-addition salts thereof.

2. A compound selected from the group consisting of N - cyclopropylmethyl - 7α - [1-(m-chlorophenyl)-5-pyrazolyl] - 6,7,8,14 - tetrahydro - 6,14-endoethenonororipavine and the non-toxic acid-addition salts thereof.

3. A compound selected from the group consisting of N - cyclopropylmethyl-7α-[1-(m-tolyl) - 5 - pyrazolyl]-6,7,8,14 - tetrahydro - 6,14 - endoethenonororipavine and the non-toxic acid-addition salts thereof.

4. A compound selected from the group consisting of 7α-(1 - phenyl - 5 - pyrazolyl)-6,7,8,14-tetrahydro-6,14-endoethenooripavine and the non-toxic acid-addition salts thereof.

5. A compound selected from the group consisting of N-cyclopropylmethyl - 7α - (1-phenyl-5-pyrazolyl)-6,7,8,14-tetrahydro-6,14-endoethanonororipavine and the non-toxic acid-addition salts thereof.

6. A compound selected from the group consisting of N - cyclopropylmethyl - 7β - [1-(m-chlorophenyl)-5-pyrazolyl] - 6,7,8,14 - tetrahydro-6,14-endoethenonororipavine and the non-toxic acid-addition salts thereof.

7. A compound selected from the group consisting of N - cyclopropylmethyl - 7α - [1-(m-chlorophenyl)-3-pyrazolyl] - 6,7,8,14 - tetrahydro-6,14-endoethenonororipavine and the non-toxic acid-addition salts thereof.

8. A compound selected from the group consisting of N-cyclopropylmethyl - 7α - [1-(m-fluorophenyl)-5-pyrazolyl] - 6,7,8,14 - tetrahydro-6,14-endoethenonororipavine and the non-toxic acid-addition salts thereof.

9. A compound selected from the group consisting of N-cyclopropylmethyl-7α-[1 - (m - bromophenyl)-5-pyrazolyl] - 6,7,8,14 - tetrahydro - 6,14 - endoethenonororipavine and the non-toxic acid-addition salts thereof.

References Cited

UNITED STATES PATENTS

| 3,318,884 | 5/1967 | Brown et al. | 260—247.7 |
| 3,318,886 | 5/1967 | Brown et al. | 260—247.5 |
| 3,329,682 | 7/1967 | Bentley | 260—285 |
| 3,433,791 | 3/1969 | Bentley | 260—285 |

DONALD G. DAUS, Primary Examiner

U.S. Cl. X.R.

260—256.4 R, 283 CN; 424—260